(12) United States Patent
Vdovin et al.

(10) Patent No.: US 11,953,194 B2
(45) Date of Patent: Apr. 9, 2024

(54) HIGH QUALITY WHITE LASER-BASED LIGHT SOURCE BY INDIRECT PUMPING OF RED PHOSPHOR

(71) Applicant: SIGNIFY HOLDING B.V., Eindhoven (NL)

(72) Inventors: Olexandr Valentynovych Vdovin, Maarheeze (NL); Ties Van Bommel, Horst (NL); Rifat Ata Mustafa Hikmet, Eindhoven (NL); Martinus Petrus Joseph Peeters, Weert (NL); Robert Van Asselt, Valkenswaard (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 249 days.

(21) Appl. No.: 17/636,275

(22) PCT Filed: Aug. 17, 2020

(86) PCT No.: PCT/EP2020/073015
§ 371 (c)(1),
(2) Date: Feb. 17, 2022

(87) PCT Pub. No.: WO2021/032690
PCT Pub. Date: Feb. 25, 2021

(65) Prior Publication Data
US 2022/0290842 A1     Sep. 15, 2022

(30) Foreign Application Priority Data

Aug. 20, 2019 (EP) ..................................... 19192524

(51) Int. Cl.
*F21V 9/38*     (2018.01)
*C09K 11/77*    (2006.01)
(Continued)

(52) U.S. Cl.
CPC ................ *F21V 9/38* (2018.02); *C09K 11/77* (2013.01); *F21V 29/503* (2015.01); *F21Y 2113/10* (2016.08); *F21Y 2115/30* (2016.08)

(58) Field of Classification Search
CPC . F21V 9/38; F21V 29/503; F21V 9/30; F21Y 2113/10; F21Y 2115/30
See application file for complete search history.

(56) References Cited

U.S. PATENT DOCUMENTS

| | | |
|---|---|---|
| 2014/0126200 A1 | 5/2014 | Kelchner et al. |
| 2016/0169459 A1 | 6/2016 | Van Bommel et al. |

(Continued)

FOREIGN PATENT DOCUMENTS

| | | |
|---|---|---|
| CN | 108028509 A | 5/2018 |
| EP | 2929573 A1 | 10/2015 |

(Continued)

*Primary Examiner* — Tracie Y Green

(57) ABSTRACT

The invention provides a lighting device (1000) comprising: —a first light source (110) configured to generate first light source light (111), having a first light source light spectral power distribution, wherein the first light source (110) comprises a laser light source (10), and wherein the first light source light (111) has an optical axis (0); —a first converter material (215), comprising a first luminescent material (210), configured to convert at least part of the first light source light (111) into first luminescent material light (211) having a first luminescent material light spectral power distribution, wherein the first luminescent material light (211) has one or more wavelengths in the green and/or yellow wavelength range; —a second converter material (225), comprising a second luminescent material (220), configured to convert part of the first luminescent material light (211) into second luminescent material light (221) having a second luminescent material light spectral power distribution different from the first luminescent material light spectral power distribution, wherein the second lumi- (Continued)

nescent material light (221) has one or more wavelengths in the orange and/or red wavelength range; wherein the first light source (110), the first converter material (215), and the second converter material (225) are configured such that first light source light (111) can only reach the second converter material (225) after scattering via the first converter material (215); wherein the optical axis (O) is incident on the first converter material (215) and is not incident on the second converter material (225); and —a first thermally conductive element (410) in thermal contact with at least part of the second luminescent material (220).

15 Claims, 10 Drawing Sheets

(51) Int. Cl.
*F21V 29/503* (2015.01)
*F21Y 113/10* (2016.01)
*F21Y 115/30* (2016.01)

(56) References Cited

U.S. PATENT DOCUMENTS

| | | | |
|---|---|---|---|
| 2018/0010740 A1* | 1/2018 | Cornelissen | H01L 33/56 |
| 2018/0100627 A1* | 4/2018 | Tamura | F21K 9/64 |
| 2018/0274737 A1 | 9/2018 | Abe et al. | |
| 2019/0097092 A1 | 3/2019 | Yamae | |
| 2021/0373222 A1* | 12/2021 | Van Bommel | G02B 6/0006 |
| 2022/0221129 A1* | 7/2022 | Cornelissen | F21K 9/69 |

FOREIGN PATENT DOCUMENTS

| | | |
|---|---|---|
| EP | 3247764 A1 | 11/2017 |
| EP | 3370309 A1 | 9/2018 |
| JP | 2010251621 A | 11/2010 |
| JP | 2019179920 A | 10/2019 |
| WO | 2013055719 A1 | 4/2013 |
| WO | 2017021087 A1 | 2/2017 |
| WO | 2017073054 A1 | 5/2017 |
| WO | 2017195303 A1 | 11/2017 |

* cited by examiner

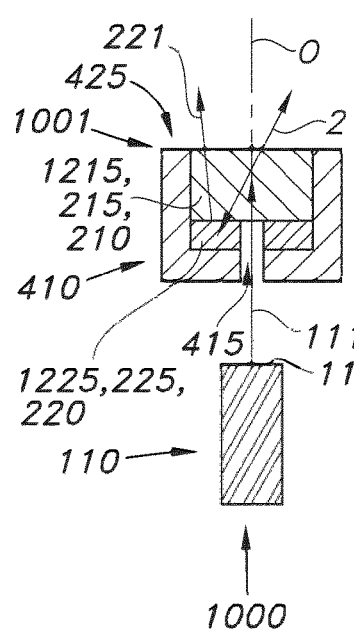 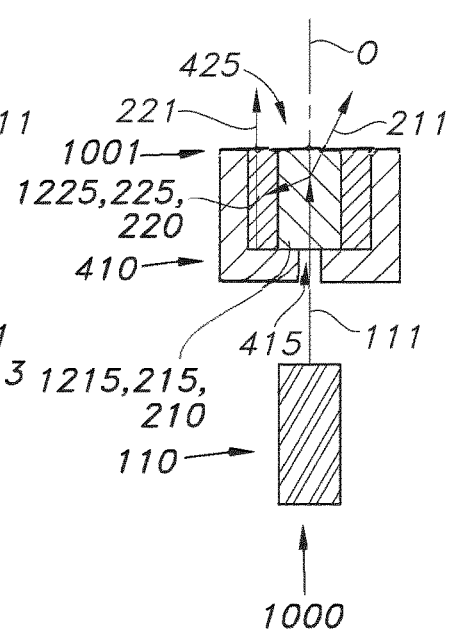 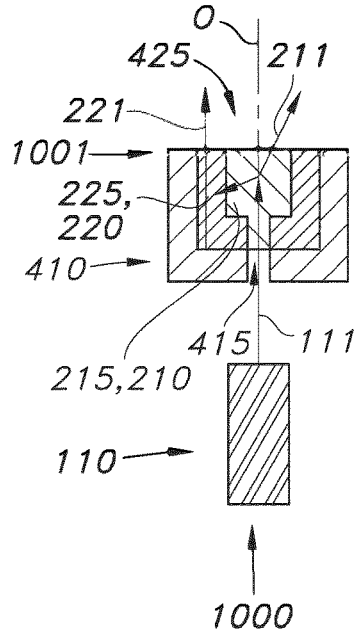
FIG. 3A  FIG. 3B  FIG. 3C
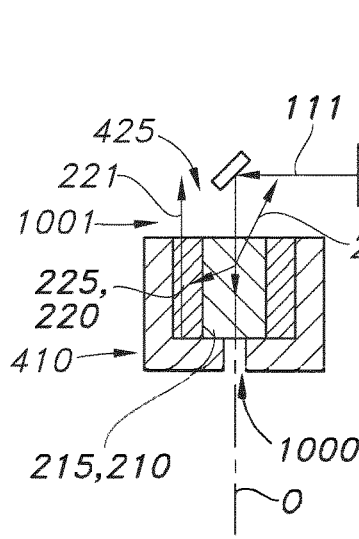 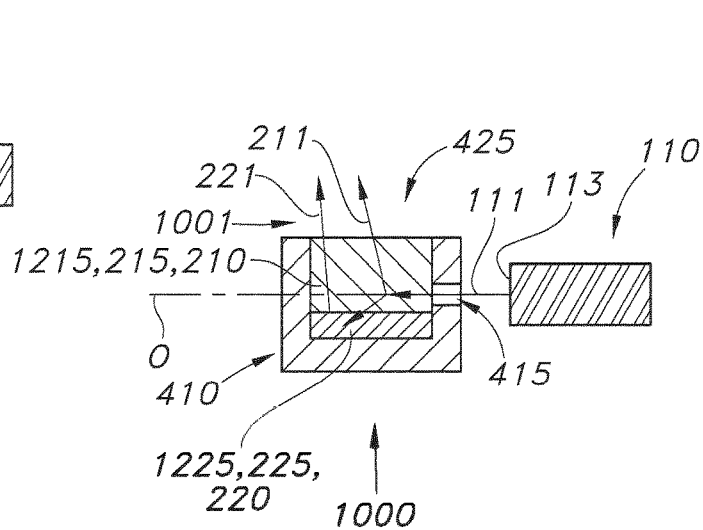
FIG. 3D  FIG. 3E

HIGH QUALITY WHITE LASER-BASED LIGHT SOURCE BY INDIRECT PUMPING OF RED PHOSPHOR

CROSS-REFERENCE TO PRIOR APPLICATIONS

This application is the U.S. National Phase application under 35 U.S.C. § 371 of International Application No. PCT/EP2020/073015, filed on Aug. 17, 2020, which claims the benefit of European Patent Application No. 19192524.7, filed on Aug. 20, 2019. These applications are hereby incorporated by reference herein.

FIELD OF THE INVENTION

The invention relates to a lighting device. The invention further relates to a lighting system comprising one or more of such lighting devices. The invention also relates to a projection system comprising such lighting device or such lighting system, or to a luminaire comprising such lighting device or such lighting system.

BACKGROUND OF THE INVENTION

Lighting devices comprising a laser and a converter are known in the art. US2019/0097092, for instance, describes a linear lighting device including a laser light source that emits laser light, a wavelength converter that converts a wavelength of the laser light and emits wavelength-converted light, and a linear light guide that is elongated and guides the wavelength-converted light emitted by the wavelength converter and introduced through a longitudinal end surface. The linear light guide includes a lateral surface which emits, from the linear light guide, the wavelength-converted light guided by the linear light guide. The proportion of the wavelength-converted light emitted by the lateral surface gradually increases with an increase in optical path length in the linear light guide.

EP3247764A1 discloses a lighting device comprising a light source and a light converter element that comprises a light transmissive matrix having a first luminescent material and a thermo-responsive liquid crystalline compound. The light transmissive matrix is in thermal contact with the light source. The light converter element is arranged for changing the color temperature of the lighting device light with the electrical power provided to the light source.

EP2929573A discloses a lighting unit comprising a first luminescent layer, a supporting layer and a first graphene layer. The supporting layer supports the luminescent layer. The first graphene layer thermally conducts heat in a lateral direction such that temperature differences in the first luminescent layer are reduced.

WO2013/055719A1 discloses a light emitting device comprises a solid-state light source, a first wavelength conversion component and a second wavelength conversion component. The second wavelength conversion component is remote to the solid state light source and the first wavelength conversion component is closer in proximity to the solid-state light source and smaller in area than the second wavelength conversion component.

SUMMARY OF THE INVENTION

There appears to be a trend in making efficient laser based light sources with high intensity. Phosphor conversion of laser light is preferred because of eye safety, speckle reduction and/or light quality considerations. For producing high quality white light with high color rendering index (CRI) it appears to be necessary to use a phosphor with red emission in addition to green or yellow emitting phosphor such as a Ce doped garnet (YAG and/or LuAG). Red phosphors, however, appear to be relatively more sensitive to temperature and/or photo saturation.

Architectures of laser-based light sources may comprise a blue pump laser and a YAG-based ceramic phosphor illuminated either in transmissive or reflective mode. As a result, it appears that essentially only high CCT (correlate color temperature) light sources with low color rendering index are available. In order to widen the range of color temperatures for laser-based sources, it appears that there is a need for additional emission (with high brightness) in the red spectral range. Using two lasers (a combination of a blue and red laser) may require the use of strongly red shifted garnets that may suffer from severe thermal quenching (high Gd and/or Ce content).

Hence, it is an aspect of the invention to provide an alternative lighting device, which preferably further at least partly obviates one or more of above-described drawbacks. The present invention may have as object to overcome or ameliorate at least one of the disadvantages of the prior art, or to provide a useful alternative.

In an aspect, the invention provides a lighting device ("device"). The lighting device comprises a first light source, a first luminescent material and a second luminescent material (especially having spectrally different emission properties). Especially, the device comprises the first light source, a first converter material (comprising the first luminescent material), and a second converter material (comprising the second luminescent material). In embodiments, the first light source is especially configured to generate first light source light, having a first light source light spectral power distribution. In yet further specific embodiments, the first light source comprises a laser light source. Further, in embodiments the first converter material (or "first light converter material") especially comprises the first luminescent material configured to convert at least part of the first light source light into first luminescent material light having a first luminescent material light spectral power distribution. In specific embodiments, the first luminescent material light has one or more wavelengths in the green and/or yellow wavelength range. Further, in embodiments the second converter material (or "second light converter material") especially comprises the second luminescent material configured to convert part of the first luminescent material light and/or part of the first light source light into second luminescent material light having a second luminescent material light spectral power distribution (which is especially different from the first luminescent material light spectral power distribution). In specific embodiments, the second luminescent material light has one or more wavelengths in the orange and/or red wavelength range (especially the range of 590-780 nm, even more especially one or more wavelengths in the 590-680 nm range). Especially, in embodiments the first light source, the first converter material, and the second converter material are configured such that (at least part of the) first light source light can only reach the second converter material after one or more of (i) reflection by the first converter material (ii) transmission, and (iii) scattering via the first converter material. Especially, in embodiments the first light source, the first converter material, and the second converter material are configured such that (at least part of the) first light source light can only reach the second converter material after scattering via the first converter material. Yet even more especially, in embodiments the first light source, the first converter material, and the second converter material are configured such that first light source light can only reach the second converter material after scattering via the first converter material.

Yet further, in embodiments the lighting device may comprise a first thermally conductive element. Especially, the first thermally conductive element is (configured) in thermal contact with at least part of the second luminescent material.

Hence, in specific embodiments the invention provides a lighting device comprising: (a) a first light source configured to generate first light source light, having a first light source light spectral power distribution, wherein the first light source comprises a laser light source; (b) a first converter material, comprising a first luminescent material, configured to convert at least part of the first light source light into first luminescent material light having a first luminescent material light spectral power distribution, wherein the first luminescent material light has one or more wavelengths in the green and/or yellow wavelength range; (c) a second converter material, comprising a second luminescent material, configured to convert part of the first luminescent material light into second luminescent material light having a second luminescent material light spectral power distribution different from the first luminescent material light spectral power distribution, wherein the second luminescent material light has one or more wavelengths in the orange and/or red wavelength range; wherein the first light source, the first converter material, and the second converter material are configured such that first light source light can only reach the second converter material after one or more of (i) reflection by the first converter material (ii) transmission, and (iii) scattering via the first converter material; and optionally (d) a first thermally conductive element in thermal contact with at least part of the second luminescent material. As indicated above, especially in embodiments the first light source, the first converter material, and the second converter material are configured such that (at least part of the) first light source light can only reach the second converter material after scattering via the first converter material.

Further, the first light source light has an optical axis (O). The first light source may generate a beam of light source light, which has an optical axis. Especially, the optical axis may be defined as an imaginary line that defines the path along which light propagates through the system starting from the light generating element, here especially the first light source. In specific embodiments, the optical axis (O) is incident on the first converter material and is not incident on the second converter material. In this way, the second converter material, especially the second luminescent material, may be protected from direct first (laser) light source light. Embodiments wherein the optical axis (O) is incident on the first converter material and is not incident on the second converter material may especially be obtained when first light source light can only reach the second converter material by scattering via the first converter material (or cannot reach the second converter material at all in specific embodiments).

As indicated above, the lighting device comprises a first light source configured to generate first light source light, having a first light source light spectral power distribution. Especially, the first light source comprises a laser light source. The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering). The term "laser light source" especially refers to a laser. Such laser may especially be configured to generate laser light source light having one or more wavelengths in the UV, visible, or infrared, especially having a wavelength selected from the range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser.

Hence, in embodiments the first light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:CaF$_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:YCa$_4$O(BO$_3$)$_3$ or Nd:YCOB, neodymium doped yttrium orthovanadate (Nd:YVO$_4$) laser, neodymium glass (Nd:glass) laser, neodymium YLF (Nd:YLF) solid-state laser, promethium 147 doped phosphate glass (147Pm$^{3+}$:glass) solid-state laser, ruby laser (Al$_2$O$_3$:Cr$^{3+}$), thulium YAG (Tm:YAG) laser, titanium sapphire (Ti:sapphire; Al$_2$O$_3$:Ti$^{3+}$) laser, trivalent uranium doped calcium fluoride (U:CaF$_2$) solid-state laser, Ytterbium doped glass laser (rod, plate/chip, and fiber), Ytterbium YAG (Yb:YAG) laser, Yb$_2$O$_3$ (glass or ceramics) laser, etc. In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank. The laser bank may in embodiments comprise heat sinking and/or optics e.g. a lens to collimate the laser light.

The laser light source is configured to generate laser light source light (or "laser light"). The first light source light may essentially consist of the laser light source light. The first light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources.

In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The first light source is especially configured to generate first light source light having an optical axis (O), (a beam shape,) and a first spectral power distribution. The first light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a first spectral power distribution (intensity on an energy scale as function of the wavelength) which may comprise one or more (narrow) bands.

In embodiments, the beam of light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light.

As indicated above, in embodiments the first light source light may essentially consist of the laser light source light. In further specific embodiments, the first light source light may essentially consist of laser light source light of one or more essentially identical laser light sources (such as from the same bin).

The first light source may especially be configured to generate light source light having one or more wavelengths in the UV and blue, such as selected from the range of 200-495 nm. Especially, at least 90% of the spectral power (in Watt) of the first light source light, such as at least 95%, is within the range of 200-495 nm, such as in the range of 350-495 nm, like at least 90% of the spectral power of the first light source light in the range of 380-495 nm. In embodiments, the first light source is configured to generate first light source light having at least 90% of the spectral power (of the first light source light) in the UV (and optionally part of the blue), especially in the wavelength range of 200-440 nm, even more especially in the wavelength range of 380-440 nm. Alternatively, in embodiments, the first light source is configured to generate first light source light having at least 90% of the spectral power (of the first light source light) in the blue, especially in the wavelength range of 440-495 nm.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm. The terms "visible", "visible light" or "visible emission" and similar terms refer to light having one or more wavelengths in the range of about 380-780 nm.

The first light source is especially configured in a remote configuration. Hence, a radiation exit face of the first light source may not be in physical contact with the light converter material(s). For instance, the distance may be at least 1 μm, like especially at least 10 μm, such as at least 100 μm, like e.g. at least 1 mm. Especially, however, the distance may be equal to or smaller than 20 mm, such as equal to or smaller than 10 mm. In embodiment, the distance between a radiation exit face of the first light source and the first converter material may be selected from the range of 10 μm-10 mm. However, other distances may also be possible. Especially, in specific embodiments the radiation exit face of the first light source may not be in optical contact (or "optical coupling") with the light converter material(s) (see further below about optical contact).

As indicated above, the lighting device comprises a first converter material, comprising a first luminescent material, configured to convert at least part of the first light source light into first luminescent material light having a first luminescent material light spectral power distribution.

The term(s) "luminescent material light spectral power distribution", and similar terms, especially refer to the spectral power distribution of the luminescent material light. The term "luminescent material light", and similar terms, especially refer to the luminescence of the luminescent material (which may be generated when the luminescent material is excited (with (first) light source light)).

Further, as indicated above, the lighting device comprises also a second converter material, comprising a second luminescent material, configured to convert part of the first luminescent material light into second luminescent material light having a second luminescent material light spectral power distribution. By converting part of the first luminescent material light, the effective spectral distribution of the first luminescent material light emanating from the lighting device may in embodiments be different from the first luminescent material light generated by the first luminescent material. For instance, when the first luminescent material light has a band shape, part of the first luminescent material light, especially in embodiments having shorter wavelengths, may be absorbed by the second luminescent material. Hence, in embodiments the first luminescent material light emanating from the lighting device may be red-shifted relative to the first luminescent material light generated by the first luminescent material.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex} < \lambda_{em}$), though in specific embodiments the luminescent material may comprise down-converter luminescent material, i.e. radiation of a larger wavelength is converted into radiation with a smaller wavelength ($\lambda_{ex} > \lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials.

Hence, the luminescent material may luminesce upon excitation with radiation, such as selected from one or more wavelengths selected from the range of 200-2000 nm, such as 300-1500 nm. Hence, the term "converter material" may especially also refer to a light converter element that at least partly absorbs one or more wavelengths in the UV, visible, or infrared, especially one or more wavelengths selected from the range of 200-2000 nm, such as 300-1500 nm, and converts such radiation, at least partly, into luminescence, especially at another wavelength.

Especially, a luminescent material is or comprises an active species. Here, the term "active species" may refer to an atom, ion, molecular group, or molecule that effectively is able to convert the light source light into luminescent material light, and thus provides the converter function to the luminescent material (or converter material).

Relevant active species may e.g. $Eu^{2+}$ or $Ce^{3+}$. Other active species may be quantum dots. Yet other active species may be organic luminescent dyes.

In embodiments, luminescent materials may be selected from garnets and nitrides, especially doped with trivalent cerium or divalent europium, respectively. Embodiments of garnets especially include $A_3B_5O_{12}$ garnets, wherein A in embodiments comprises one or more of Y, La, Gd, Tb and Lu, especially (at least) one or more of Y, Gd, Tb and Lu, even more especially A comprises at least yttrium or lutetium, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1.

The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$.

Ce in garnets is substantially or only in the trivalent state, as is known to the person skilled in the art.

In embodiments, the first luminescent material (thus) comprises $A_3B_5O_{12}$ wherein in specific embodiments at maximum 10% of B-O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein x1+x2+x3=1, wherein x3>0, wherein 0<x2+x3≤0.2, wherein y1+y2=1, wherein 0≤y2≤0.2, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B-O may be replaced by Si—N. Here, B in B-O refers to one or more of Al, Ga, In and Sc (and O refers to oxygen); in specific embodiments B-O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)).

In specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B-O may be replaced by Si—N. Here, the percentage refers to moles (as known in the art); see e.g. also EP3149108.

In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Blue luminescent concentrators can be based on YSO $(Y_2SiO_5:Ce^{3+})$, or similar compounds, or BAM $(BaMgAl_{10}O_{17}:Eu^{2+})$, or similar compounds, especially configured as single crystal(s).

In embodiments, a red luminescent material may comprise one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by Eu$^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

The garnet type luminescent material may especially be applied as first luminescent material.

The term "luminescent material" herein especially relates to inorganic luminescent materials, which are also sometimes indicated as phosphors. These terms are known to the person skilled in the art.

In embodiments, quantum dots and/or organic dyes may be applied and these may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS$_2$) and/or silver indium sulfide (AgInS$_2$) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The converter material may consist of the luminescent material. However, the converter material may also comprise the luminescent material. For instance, the luminescent material may be embedded in a host material, like an inorganic material or polymeric material. In embodiments, the converter material consists of the active species. However, the converter material may also comprise the active species. For instance, the active species may be embedded in a host material, like an inorganic material or polymeric material. For instance, trivalent cerium may be available in a garnet host lattice. The garnet host lattice with trivalent cerium may be the luminescent material or converter element. However, an inorganic luminescent material or organic luminescent material may also be embedded in e.g. a polymeric, like siloxane or PMMA, host material. Such embodiment, the host material and luminescent material may essentially provide the converter material. the term "embedded", and similar terms, may refer to dispersed, molecular dispersed, solved, etc.

The converter material may especially be at least partly transmissive for light having one or more wavelengths in the range of 200-1500 nm, especially in the visible wavelength range. Especially when a host material is used, wherein the luminescent material is embedded, the host material may be at least partly transmissive for light having one or more wavelengths in the range of 200-1500 nm, especially in the visible wavelength range. Hence, in specific embodiments the host material comprises or may essentially consist of light transmissive (host) material.

The term "light transmissive host material" and similar terms may especially refer to light transmissive material, especially light transparent material, (transmissive, especially transparent) for one or more wavelengths in the visible, such as in the green and red, and in general also in the blue. Suitable host materials may comprise one or more materials selected from the group consisting of a transmissive organic material, such as selected from the amorphous polymers group, e.g. PC (polycarbonate), polymethylacrylate (PMA), polymethylmethacrylate (PMMA) (Plexiglas or Perspex), cellulose acetate butyrate (CAB), silicone, PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN). Hence, the light transmissive material is especially a polymeric light transmissive material. However, in another embodiment the light transmissive material may comprise an inorganic material. Especially, the inorganic light transmissive material may be selected from the group consisting of glasses, (fused) quartz, transmissive ceramic materials (such as garnets), and silicones. Glass ceramic materials may also be applied. Also, hybrid materials, comprising both inorganic and organic parts may be applied. Especially, the light transmissive material comprises one or more of PMMA, transparent PC, or glass.

Hence, the first converter material, even more especially the first converter element may be a light transmissive light converter element.

The above embodiments refer to both the first luminescent material, the second luminescent material, the first converter material, and the second converter material.

Especially, however, (at least the type of) luminescent materials differ.

As indicated above, the first luminescent material light has one or more wavelengths in the green and/or yellow wavelength range (i.e. especially the range of 495-590 nm). Especially, at least 50% of the spectral power (in Watts) of the first light source light, such as at least 60%, yet even more especially at least 70%, such as at least 80%, like even more especially at least 90%, is within the range of 495-590 nm. It may also be possible to use a first luminescent material that has too much emission intensity in less desired wavelength range. In such embodiments, a combination of a first luminescent material and a (first) optical filter may be applied, such that effectively the first luminescent material light has at least 80% of the spectral power of the first light source light, like even more especially at least 90%, within the range of 495-590 nm.

As also indicated above, the second luminescent material may especially be configured to convert part of the first luminescent material light into second luminescent material light having a second luminescent material light spectral power distribution different from the first luminescent material light spectral power distribution. For instance, in embodiments the spectral overlap of the first luminescent material light with the second luminescent material and the spectral overlap of the second luminescent material light with the first luminescent material light are both below 70%, especially below 60%, even more especially below 50%.

Especially, in embodiments the second luminescent material light has one or more wavelengths in the orange and/or red wavelength range. Especially, at least 50% of the spectral power (in Watt) of the first light source light, such as at least 60%, yet even more especially at least 70%, such as at least 80%, like even more especially at least 90%, is within the range of 590-780 nm. It may also be possible to use a second luminescent material that has too much emission intensity in less desired wavelength range. In such embodiments, a combination of a second luminescent material and a (second) optical filter may be applied, such that effectively the second luminescent material light has at least 80% of the spectral power of the first light source light, like even more especially at least 90%, within the range of 590-780 nm.

In specific embodiments, the first light source, the first converter material, and the second converter material are especially chosen such and configured such that the absorption of the light source light by the second luminescent material leads to a lower emission intensity (E1) than the emission intensity (E2) induced by absorption (by the second luminescent material) of the first luminescent material light. For instance, $E1/E2 \leq 1$, like especially $E1/E2 \leq 0.5$, such as especially $E1/E2 \leq 0.1$, or even $E1/E2 \leq 0.05$.

As indicated above, in embodiments the lighting device may in embodiments be configured such that the second luminescent material is essentially only pumped by the first luminescent material light.

In (other) embodiments, part of the first light source light may be converted by the second luminescent material into luminescent material light. Especially, this part of the first light source light is not directly received by the converter material, but only after reflection by and/or scattering by, and/or transmission through the first converter. In this way, the second luminescent material may receive a lower dose of first light source light than the first luminescent material. As the second luminescent material may be less stable and/or may have a lower quenching temperature and/or may have a longer decay time and/or may be more prone to photo saturation, a lower dose may be desirable. Hence, in embodiments the first light source, the first converter material, and the second converter material are configured such that first light source light can only reach the second converter material after scattering via the first converter material.

In the case of scattering, the second converter material may receive scattered first light source light, such as scattered laser light. Further, the second converter material may receive first luminescent material light. Hence, in embodiments the second luminescent material may convert one or more of (scattered) first light source light and first luminescent material light, especially at least first luminescent material light.

In specific embodiments, the first converter material, especially the first converter element, may be transparent. In this way, in embodiments essentially no first light source light may be scattered to the second converter material. Hence, in such embodiments the second luminescent material may essentially only convert first luminescent material light into second luminescent material light. In embodiments, at maximum 10% (optical Watts of the first light source light), such as at maximum 5%, like at maximum 3% of the first light source light may be scattered to the second luminescent material. Even more especially, at maximum 2%, like at maximum 1%, of the first light source light, such as laser light, may be scattered by the first converter material to the second luminescent material. A small scattering may lead to a low load of the second luminescent material with the first light source light. In this way, less heat may be generated by the second luminescent material, such as the red phosphor. Further, in this way the performance of the second luminescent material may be better.

Note that the phrase "can only reach the second converter material", and similar phrases, does not necessarily imply that some first light source light reaches the second luminescent material at all (after reflection and/or transmission and/or scattering). In embodiments, this may be the case, whereas in other embodiments this may (essentially) not be the case. Further, the phrase "can only reach the second converter material", and similar phrases, does not imply that no first light source light reaches the second luminescent material directly. However, in embodiments this will be limited. In embodiments, of all photons of the first light source light that reaches the first converter and second converter, equal to or less than 10%, such as at maximum 5%, like at maximum 1%, may reach the second converter material without reflection at or transmission through the first converter. Hence, especially of the spectral power (in Watts) of the first light source light that reaches the second converter material, equal to or more than 50%, such as at minimum 70%, like at minimum 90%, may reach the second converter material after reflection at, or scattering by, or transmission through the first converter. More especially, of the spectral power (in Watts) of the first light source light that reaches the second converter material, equal to or more than 90%, like at least 95%, such as at least 97%, like even more especially at least 98% may reach the second converter material after scattering by the first converter.

Hence, in specific embodiments the first converter material, the second converter material, and the first light source may be configured such that at least 50%, like at least 60%, such as especially at least 70%, even more especially at least 90% of the second luminescent material light is generated by conversion of the first luminescent material light. Therefore, in specific embodiments the second luminescent material may generate the second luminescent material light essentially based on conversion of first luminescent material light. Hence, in embodiments the second luminescent material may essentially be pumped with the first luminescent material light (and thus essentially not with the first light source light); however, other embodiments may also be possible.

First light source light and/or first luminescent material light may in specific embodiments only escape from the lighting device via the second converter material. Hence, in embodiments the second converter material may be transmissive for at least part of the light source light. Alternatively or additionally, in embodiments the second converter element is transmissive for at least part of the first luminescent material light. Here, "transmissive" especially implies that the material has an absorption and thickness allowing transmission of at least part of the (indicated light). Hence, in specific embodiments the second converter material may be transmissive for one or more of (i) at least part of the first light source light and (ii) at least part of the first luminescent material light. Therefore, especially the first light source, the first converter material, and the second converter material may be configured such that one or more of (a) at least part of the first light source light and (b) at least part of the first luminescent material light escapes from the lighting device via the second converter material.

However, in yet other embodiments first light source light and/or second luminescent material light may in specific embodiments only escape from the lighting device via the first converter material. Hence, in embodiments the first converter material may be transmissive for at least part of the light source light. Alternatively or additionally, in embodiments the first converter element is transmissive for at least part of the second luminescent material light. Here, "transmissive" may also especially imply that the material has an absorption and thickness allowing transmission of at least part of the (indicated light). Hence, in specific embodiments the first converter material may be transmissive for one or more of (i) at least part of the first light source light and (ii) at least part of the second luminescent material light. Therefore, especially the first light source, the second converter material, and the first converter material may be configured such that one or more of (a) at least part of the first light source light and (b) at least part of the second luminescent material light escapes from the lighting device via the first converter material.

Lighting device light may emanate from a light exit window or radiation exit face or exit surface. The radiation exit face may in embodiments comprises a first exit portion and a second exit portion. The first exit portion may comprise at least part of the first converter material; the second exit portion may comprise at least part of the second converter material. However, in (other) embodiments the radiation exit face may not comprise the first converter material. Alternatively or additionally, in (other) embodiments, the radiation exit face may not comprise the second converter material.

In embodiments, the lighting device may comprise a single radiation exit face.

In embodiments, the (single) radiation exit face may especially be planar. In embodiments, the (single) radiation exit face may have at least two axes of symmetry (e.g. square), or at least three axes of symmetry (e.g. hexagon), or may be circular. An optical axis of the lighting device light may essentially be perpendicular to the (single) radiation exit face.

In (optional) embodiments, a thermally conductive element may be provided, to guide away one or more of heat from the first light source, heat from the first luminescent material, and heat from the second luminescent material.

Especially, in embodiments the lighting device may further comprises a first thermally conductive element in thermal contact with at least part of the second luminescent material.

A thermally conductive element may be a heat sink. A thermally conductive element may comprise, or essentially consist of a thermally conductive material. A thermally conductive material may have a thermal conductivity of at least about 20 W/m/K, like at least about 30 W/m/K, such as at least about 100 W/m/K, like especially at least about 200 W/m/K. In embodiments, the thermally conductive material may comprise a metal, such as copper or aluminum. Alternatively or additionally, the thermally conductive material may comprise graphite or a ceramic material.

Further, thermally conductive element may be reflective for (first) light source light and/or (first and/or second) luminescent material light. Hence, both functions may be provided by a single element. The term "element" may also refer to a plurality of (different) elements (each having one or both of these functions).

The element may comprise a highly reflective (Miro) reflector to improve optical recycling. Herein, the term "Miro" refers to reflective material, especially from Alanod/ Westlake Metal Ind., that have a high (surface) reflectivity. Especially, such reflective material is highly specular reflective, with equal to or less than 10%, such as equal to or less than 6% diffuse reflection under perpendicular radiation, the remainder being specular reflection, especially under irradiation with visible light. Hence, the Miro reflective material may be applied (herein) as specular reflector. In specific embodiments the (reflective and/or thermally conductive) element may comprise AlSiMgMn.

The (reflective and/or thermally conductive) element may especially not be in optical contact with the converter material. Hence, there may be a non-zero distance between the element and the converter material. Especially, the distance is at least wavelength of interest, more especially at least twice the wavelength of interest. Further, as there may be some contact, e.g. for holding purposes or for distance holder purposes, especially an average distance is at least $\lambda_i$, such as at least $1.5*\lambda_i$, like at least $2*\lambda_i$, such as especially about $5*\lambda_i$, wherein $\lambda_i$ is the wavelength of interest. Especially, however, the average distance is in embodiments not larger than 50 μm, such as not larger than 25 μm, like not larger than 20 μm, like not larger than 10 μm, for purposes of good thermal contact. Likewise, such average minimum distance may apply to a reflector and/or optical filter configured at e.g. an end face, or other optical components as well. Optionally, in embodiments an element may comprise both heat sinking function a reflection function, such as a heat sink with a reflective surface, or a reflector functionally coupled to a heat sink. The wavelength of interest (Xi) may especially be the wavelength at maximum emission of the luminescence of the luminescent material, such as of the first luminescent material or of the second luminescent material. For safety reasons, the latter may be chosen. Hence, to prevent optical coupling the average distance may be at least j, such as at least $1.5*\lambda_i$, like at least $2*\lambda_i$, such as especially at least about $5*\lambda_i$.

The reflectivity of the (reflective) element is especially high (under perpendicular irradiation), such as at least 85%, like at least 88%, such as especially at least 92%.

The first converter material may be provided as a layer or a body. Alternatively or additionally, the second converter material may be provided as a layer or a body. The term "layer" and similar terms may also refer to a plurality of (different) layers. The term "body" and similar terms may also refer to a plurality of (different) bodies. Hence, in embodiments the lighting device may comprise (i) a first converter element comprising the first converter material, wherein the first converter element comprises a layer or a body, and/or (ii) a second converter element comprising the second converter material, wherein the second converter element comprises a layer or a body. In specific embodiments, the first converter element may essentially consist of a first converter material layer or a first converter material body. Alternatively or additionally, in specific embodiments, the second converter element may essentially consist of a second converter material layer or a second converter material body.

For instance, in embodiments the first converter and second converter may be provided as a layered structure. Instead of the term "layered structure", and similar terms, also the term "stacked structure" may be chosen. When layered structures of the converters are applied, the first converter and second converter may be in physical contact with each other. Hence, the average distance between the first converter and second converter may be (substantially) less than 1 μm, especially less than 0.1 μm, such as less than 0.01 μm, i.e. practically 0 μm.

However, in other embodiments the first converter and second converter may be provided as (essentially) separate layers (see also below). Hence, in specific embodiments the first converter element and the second converter element are configured in a layered structure. Hence, a layer may comprise the first converter element and another layer may comprise the second converter element.

In embodiments, one or more of the layers, in specific embodiments both layers, may be essentially planar layers. In embodiments one or more of the layers, in specific embodiments both layers, may be configured in a curved shape. For instance, the layers may have the shape of cylinder or rod, like a cylinder in a cylinder, or like a rod in a cylinder.

One layer may be curved, and the other layer may be planer. For instance, one layer may have a conical shape, and another layer may be planer.

In embodiments, the first converter material may (as layer) enclose the second converter material (as layer or as body). In other embodiments, the second converter material may (as layer) enclose the first converter material (as layer or as body). Such layered system may be hollow. However, such layered system may also be a solid body.

Layered systems may have a square or circular cross-section (cross-section especially parallel to the layer(s)). However, other embodiments may also be possible, like hexagonal or trigonal, etc.

Further, the first converter element has a first surface area A1, and the second converter element has a second surface area A2. The term "surface area" especially refers to the area of the external surface of the element. For instance, would the element be a layer with a top surface area At and a bottom surface area Ab, wherein in general At=Ab, then the surface area will be essentially 2*At (assuming the layer thickness is much smaller than At).

As indicated above, the first converter material and/or the second converter material may be in thermal contact with the thermally conductive element. In specific embodiments, at least 35% of the second surface area A2 may be in thermal contact with the first thermally conductive element. It may be desirable to guide away a good as possible the heat from the second converter material. In further specific embodiments, in the range of about 35-70% of the second surface area A2 may be in thermal contact with the first thermally conductive element. For instance, in embodiments 40% to about 50% of the second surface area A2 may be in thermal contact with the first thermally conductive element. The larger the thermal contact, the better the heat exchange can be.

In embodiments, the part of the second surface area in contact with the first thermally conductive element is larger than the part of the first surface area in contact with the first thermally conductive element. Alternatively or additionally, the percentage of the second surface area in contact with the first thermally conductive element is larger than the percentage of the first surface area in contact with the first thermally conductive element.

Especially, in embodiments a first ratio R1 of a percentage PA1 of the first surface area A1 in thermal contact with the first thermally conductive element to a percentage PA2 of the second surface area A2 in thermal contact with the first thermally conductive element is selected from the range of $0 \leq R1 < 1$, such as $0 \leq R1 \leq 0.75$. Especially, in embodiments the percentage PA2 is substantially larger than of PA1. In further specific embodiments, a first ratio R1 of a percentage PA1 of the first surface area A1 in thermal contact with the first thermally conductive element to a percentage PA2 of the second surface area A2 in thermal contact with the first thermally conductive element is selected from the range of $0 \leq R1 \leq 0.5$, such as selected from the range of $0 \leq R1 \leq 0.25$. In this way, heat of the first converter material will essentially not be guided away via the first thermally conductive element.

In specific embodiments, the second converter material may be in thermal contact with the first thermally conductive element. Alternatively or additionally, in embodiments the first converter material may be in thermal contact with the first thermally conductive element. Alternatively or additionally, in embodiments the first converter material may be in thermal contact with the second converter material.

The first thermally conductive element at least partly encloses the first converter material and the second converter material, wherein the first thermally conductive element comprises a window, wherein in specific embodiments the window comprises one or more of a light transmissive material and an opening, wherein the first light source is configured upstream of the window and wherein the first converter material is configured downstream of the window. Hence, (first) light source light may enter via the opening, and primarily be received by the first converter material, before being received by the second converter material (if any). The window may comprise a light transmissive material, like one or more of the above-mentioned light transmissive materials, like glass, PMMA, etc. The window may optionally have the shape of lens. The window may also be an opening. The window may be a pinhole. The window may have an equivalent circular diameter of e.g. less than 1 cm, like less than 0.5 mm. The term "opening" may also refer to a plurality of (different) openings. An advantage is that the surface area for cooling as provided by the first thermally conductive element is increased, resulting in an improved cooling of the first and second converter materials.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The lighting device may provide lighting device light during operation. The lighting device light may comprise the first luminescent material light and the second luminescent material light and in specific embodiments also the (first) light source. In embodiments, the first light converter, the second light converter, and the (first) light source are chosen that white lighting device light may be generated. Hence, in specific embodiments the lighting device is configured to generate (in one or more modes of operation) (white) lighting device light comprising the first luminescent material light, the second luminescent material light, and the light source light.

Hence, the invention also provides embodiments wherein the first light source, the first converter material, and the second converter material are configured such that part of the first light source light escapes from the lighting device without being converted by the first luminescent material or the second luminescent material (and is thus comprised in the lighting device light).

For instance, up to about 30% of the first light source light, like up to about 25% of the first light source light, like in the range of 10-25% of the first light source light may escape from the lighting device (as part of the lighting device light). Further, in the range of 55-80%, such as 60-75%, such as especially in the range of 60-72% of the first light source light may be converted into first luminescent material light. Further, in the range of about 20-75%, such as 22-70%, such as especially in the range of 25-67%, like e.g. 27-65%, of the first luminescent material light may be converted into second luminescent material light. Here, the percentage are based on the optical watts. For instance, starting with 1 Watt blue, 10-25% thereof may stay unconverted (and 75-90% may be converted). Due to Stokes losses, 0.75-0.9 Watt of the blue may be converted into about 0.6-0.72 Watt green. This provides e.g. the above indicated percentage of 60-72% (and not 75-90%). Similarly, this applies to the conversion of first luminescent material light into second luminescent material light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

In specific embodiments, the lighting device may be configured to generate (in one or more operation modes) white lighting device light having a color rendering index selected from the range of at least 80 and having a correlated color temperature selected from the range of 1800-10000 K, like 2000-10000 K, such as at least 2700 K, like at least 3000 K, like up to 8000 K. In specific embodiments, the CRI may be at least 85, even more especially at least 90.

In specific embodiments, the second luminescent material may be configured to convert one or more of (i) part of the first luminescent material light and (ii) part of the first light source light into second luminescent material light, especially may be configured to convert (i) part of the first luminescent material light and (ii) part of the first light source light into second luminescent material light. As indicated above, the first luminescent material light emanating from the lighting device may be red-shifted relative to the first luminescent material light generated by the first luminescent material. In specific embodiments the second luminescent material may be configured to convert one or more of (i) part of the first luminescent material light and (ii) part of the first light source light into second luminescent material light having one or more wavelengths in the amber-red wavelength range (i.e. especially the range of 585-780 nm, even more especially at least selected from the range of 585-680 nm). As indicated above, the second luminescent material light spectral power distribution is different from the first luminescent material light spectral power distribution.

In embodiments, the first converter material may be configured such relative to the light source and the second converter material, that at least part of the (first) light source light can essentially only reach the second converter material via transmission through the first converter material. Especially, transmission may be controlled by the concentration of the active species and the layer thickness of the first converter material. Alternatively, the first converter material may be configured such relative to the light source and the second converter material, that at least part of the (first) light source light can essentially only reach the second converter material via scattering by the first converter material.

Hence, in specific embodiments the first converter material is at least partly transmissive for the first light source light.

Yet further, in specific embodiments one or more of the first converter material and the second converter material are provided as ceramic body. Hence, the first converter material may be comprised by or may be a ceramic body. Alternatively or additionally, the second converter material may be comprised by or may be a ceramic body. In (very) specific embodiments the first converter material and the second converter material may be comprises by or may be a (single) ceramic body.

Yet further, in specific embodiments the second luminescent material is configured to convert part of the first luminescent material light and part of the first light source light into second luminescent material light. In alternative embodiments, the second luminescent material may especially be configured to convert essentially only part of the first luminescent material light. The latter may e.g. be achieved by applying a second luminescent material that has essentially no absorption at wavelengths of the first light source light and/or by configuring the device such, that essentially no first light source light reaches the second luminescent material light.

When a single first light source is applied, the spectral distribution of the lighting device light may (in embodiments) be essentially fixed. For instance, this may be white lighting device light. Would a plurality of (essentially identical) first light sources be applied, e.g. solid state laser light sources from the same bin, in embodiments the spectral distribution of the lighting device light may be essentially fixed, but in other embodiments, the spectral distribution of the lighting device light may be controllable. This may especially be the case when two or more first light sources have different ratios of numbers of photons reaching the second converter material and first converter material. For instance, this may depend upon the configuration of the light source relative to the first converter material and/or on the shape or configuration of the converter material. Hence, in such embodiments the spectral distribution of the lighting device light may be controllable.

Alternatively or additionally, it may be desirable to use a second light source, configured to generate second light source light, having a spectral distribution different from the first light source light. Such second light source may be used to increase one or more of the color gamut, the spectral distribution controllability, the color rendering index (CRI), etc. Especially, in embodiments the second light source may be configured to generate red second light source light. Hence, in embodiments the lighting device may further comprise a second light source configured to generate second light source light having a second light source light spectral power distribution, different from the first light source light spectral power distribution, wherein the second light source light has one or more wavelengths in the red wavelength range, wherein the lighting device is configured to generate in one or more operation modes lighting device light comprising the first luminescent material light, the second luminescent material light, the first light source light, and the second light source light, which may be white lighting device light.

For the second light source essentially the same embodiments as above described in relation to the (first) light source apply. For instance, Especially, the second light source may (also) comprise a laser light source; see further also above. Further, especially the term "second light source" may also refer to a plurality of second light sources, including two or more different (types of) second light sources. Hence, e.g. a cyan emitting second light source and/or a red emitting second light source may be applied. When the second light source is configured to generate red second light source light, in embodiments essentially all second light source light may escape from the lighting device (and may be comprised in the lighting device light emanating from the lighting device).

As indicated above, in embodiments it may be possible to control the spectral distribution, such as by controlling the first light source(s) and/or the second light source(s).

Hence, in specific embodiments the lighting device may further comprising (or be functionally coupled to) a control system, wherein the control system is configured to control a spectral power distribution of the lighting device light. Controlling the spectral power of the device light may be achieved by e.g. controlling a plurality of first light sources, or by controlling the first light source and the second light source (when available), or especially by controlling one or more first light sources and one or more second light sources. Alternatively or additionally, controlling of the spectral power of the device light may be achieved by e.g. controlling a controllable reflective polarizer (see further also below).

The system, or apparatus, or device may execute an action in a "mode" or "operation mode" or "mode of operation". Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability). Hence, in embodiments, the control system may control in dependence of one or more of an input signal of a user interface, a sensor signal (of a sensor), and a timer. The term "timer" may refer to a clock and/or a predetermined time scheme. See further also below.

Especially, there may be a plurality of modes of operation, such as at least two, like at least three, such as at least five, like at least 8, such as at least 16. A change between the modes of operation may be stepwise or stepless. Control can be analogical or digital.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. . . . . Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. . . . . The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, ZigBee, BLE or WiMAX, or another wireless technology.

It may be desirable to separate the thermal pathways for the first converter element and the second converter element. In such embodiments, it may be desirable when the first converter element and the second converter element are not in physical contact, or only for a limited area, or are not in thermal contact, or only over a limited area. Hence, in specific embodiments one or more of the following may apply: (i) equal to or less than 10% of the first surface area A1 may be in thermal contact with the second converter element, and (ii) equal to or less than 10% of the second surface area A2 may be in thermal contact with the first converter element. As indicated above, thermal contact may be the case when the average distance is equal to or smaller than 50 µm, such as not larger than 25 µm, like not larger than 20 µm, like not larger than 10 µm, such as in (full) physical contact.

Average non-zero distances may e.g. be obtained when parts of a face are in physical contact with another face and other parts of the face are not in physical contact with the other face. E.g. roughness may provide parts that are in physical contact and parts that are not in physical contact. Alternatively or additionally, distance holders may be applied, like particles (or beads). In this way, essentially planar faces (parallel configured faces) may nevertheless be at an average non-zero distance. Hence, in this way optical coupling or thermal coupling may be controlled. Further, in this way physical coupling may be minimized. Physical coupling may lead to a loss of light. Hence, though (full) physical contact may be desirable in view of heat transfer, it may be chosen to use thermal contact with an average non-zero distance in view of optical efficiency reasons.

Alternatively or additionally, thermal pathways may (further) be separated when the first converter element is in thermal contact with another thermally conductive element than the second converter element. Hence, in specific embodiments the first converter element is configured in thermal contact with a second thermally conductive element, and wherein the second converter element is configured in thermal contact with the first thermally conductive element. Especially, the first thermally conductive element and the second thermally conductive element are not in thermal contact with each other (or only over a limited area (see also above in relation to the thermal contact of the first converter element and the second converter element).

In embodiments, a light mixing chamber may be used. Such light mixing chamber may be used to mix the first luminescent material light and second luminescent material light, and optionally first light source light and/or optionally second light source light. In this way, lighting device light emanating from the lighting device may be (well) mixed. Hence, in embodiments the lighting device may comprise a light mixing chamber, wherein the light mixing chamber comprises an envelope and a chamber window, (essentially) together defining a chamber volume. In yet further specific embodiments, the envelope may comprise at least part of the (second converter material comprising the) second luminescent material and/or the chamber window may comprise at least part of the (first converter material comprising the) first luminescent material. In alternative further specific embodiments, the envelope may comprise at least part of the (first converter material comprising the) first luminescent material and/or the chamber window may comprise at least part of the converter material comprising the) second luminescent material. Dependent upon the position of the first light source, the first light source light may essentially only reach the second converter material after one or more of (i) reflection by the first converter material (ii) transmission, and (iii) scattering via the first converter material. Especially, as indicated above in embodiments the first light source light may essentially only reach the second converter material by scattering via the first converter material.

When generating white device light, the first light source light may especially be blue light, for instance using a blue laser light source. However, it may also be possible to use a UV light source. In the latter case a blue luminescent material may have to be used, configured to convert at least part of the UV light into blue luminescent material light.

In such embodiments, the first luminescent material may be configured to convert one or more of the first light source light and blue luminescent material light into the first luminescent material light. Further, in such embodiments the second luminescent material may be configured to convert one or more of the first light source light, the blue luminescent material light, and the first luminescent material light, into the second luminescent material light. In embodiments, the first light source, the blue luminescent material, the first converter material, and the second converter material are configured such that first light source light and/or the blue luminescent material light can only reach the second converter material after one or more of (i) reflection by the first converter material (ii) transmission, and (iii) scattering via the first converter material. In specific embodiments, the blue luminescent material may be configured to convert at least 90% (of the optical Watts) of the first light source light having wavelength essentially in the UV. Further, as indicated above the first light source light may essentially only reach the second converter material after scattering via the first converter material (and thus essentially not via only transmission or only reflection).

Hence, in specific embodiments the lighting device may further comprise a third converter material, comprising a third luminescent material, configured to convert at least part of the first light source light into third luminescent material light having a third luminescent material light spectral power distribution, wherein the third luminescent material light has one or more wavelengths in the blue wavelength range, wherein the first luminescent material is configured to convert at least part of one more of the third luminescent material light and the first light source light. As indicated above, especially the first light source light has (in such embodiments) one or more wavelengths in the UV. Further, in embodiments the term "third luminescent material" especially refers to a blue luminescent material (see also above).

In yet a further aspect, the invention also provides a lighting system comprising one or more lighting devices as defined herein and control system configured to control the one or more lighting devices. Especially, the lighting system is configured to generate lighting system light, wherein in one or more operation modes of the lighting system the lighting system light comprises one or more of the lighting device light of the one or more lighting devices. Especially, the invention provides further a lighting system comprising two or more lighting devices according to any one of the preceding claims and a system control system, wherein the lighting system is configured to generate lighting system light, wherein in one or more operation modes of the lighting system the lighting system light comprises one or more of the lighting device light of the two or more lighting devices.

In yet a further aspect, the invention also provides a projection system or a luminaire comprising the lighting device as defined herein or the lighting system as defined herein.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3f schematically depict some further variants.

The schematic drawings are not necessarily to scale.

DETAILED DESCRIPTION OF THE EMBODIMENTS

Figure 1:
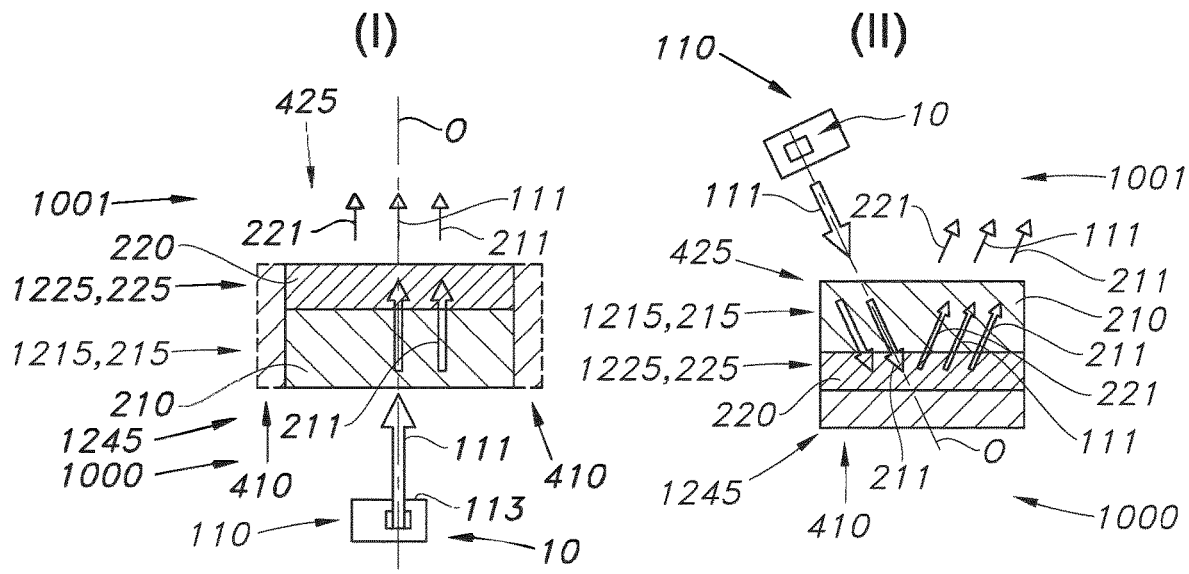
FIG. 1 schematically depicts some reference variants.

Embodiments may comprise two-component phosphor system (green and red phosphor). The green phosphor is being pumped by a blue laser light. Blue laser source can be a direct laser, or a pre-shaped beam by optical components, or being an output of a fiber for remote light transport. Part of the blue light transmitted through the green phosphor and green emission is incident on a red phosphor. The red phosphor partially absorbs and partially transmits blue and green light. As there is an overlap between the absorption spectrum of red phosphor and emission spectrum of a green phosphor, part of the green phosphor emission is being re-absorbed and effectively the green spectrum shifts to the longer wavelength range. This helps in lowering the color temperature and reaching higher CRI. Another advantage of this architecture is that the red phosphor is pumped not directly by a blue laser, but indirectly via green phosphor, with lower power density, which helps in lowering the thermal and photo-saturation load. Possible implementations of this architecture are depicted in FIG. 1, with in a transmissive mode (left) and reflective (right) mode right. The transmissive mode may be preferred for compactness, but it may be more challenging in terms of thermal management. Both green and red phosphors may need to be sufficiently cooled. This can be done by embedding the phosphor in the white reflective ceramic matrix or placing in between optically transparent components with good thermal conductivity (e.g. sapphire). At the light exit side a primary optical component can be attached which will also has a function of cooling the phosphor. A dichroic mirror can me attached or deposited at the laser entrance side transmitting only narrow spectral range(s) of pump wavelength and reflecting the converted light towards the output. Additional dichroic layer can be applied in between red and green phosphors to prevent red emission going in the direction opposite to the intended light output; this may especially be relevant in transmissive configurations.

A transmissive mode may in embodiments provide good thermal management. In this case the red phosphor can be directly attached to a heatsink. Also the amount or re-absorption and red-shift of a green spectrum will be much higher in this case, as the red phosphor is sandwiched in between the green phosphor and reflective heatsink, such that all the red light will need to go through the red phosphor before it will exit the package. In this version placing a dichroic mirror in between the two phosphor is not advised as it would prevent excitation of the red phosphor by a green emission (such excitation is preferred in view of smaller Stocks shift losses).

Amongst others, FIG. 1 schematically depict two (reference) examples of a lighting device 1000, of which embodiments are herein described.

The lighting device 1000 comprises a first light source 110 configured to generate first light source light 111. The first light source light 111 has a first light source light spectral power distribution. The first light source 110 comprises a laser light source 10. The laser light source is configured to generate laser light source light. The first light source light may in embodiments essentially consist of the laser light source light. Reference 113 refers to a radiation exit face of the first light source 110, from which the first light source light 111 emanates.

The lighting device 1000 further comprises a first converter material 215, comprising a first luminescent material 210. The first luminescent material 210 is especially configured to convert at least part of the first light source light 111 into first luminescent material light 211. The first luminescent material light has a first luminescent material light spectral power distribution (different from the first light source light spectral power distribution). The first luminescent material light 211 has one or more wavelengths in the green and/or yellow wavelength range (see also FIG. 5).

The lighting device 1000 further comprises a second converter material 225, comprising a second luminescent material 220. The second luminescent material 220 is especially configured to convert part of the first luminescent material light 211 into second luminescent material light 221. The second luminescent material 220 has a second luminescent material light spectral power distribution different from the first luminescent material light spectral power distribution. The second luminescent material light 221 has one or more wavelengths in the orange and/or red wavelength range.

As schematically depicted in both embodiments, i.e. transmissive (I) and reflective (II), the first light source 110, the first converter material 215, and the second converter material 225 are configured such that first light source light 111 can only reach the second converter material 225 after one or more of (i) reflection by the first converter material 215 (embodiment II) (ii) transmission (embodiment I), and (iii) scattering via the first converter material 215.

Examples I and II of FIG. 1 are especially shown for reference purposes. In embodiments I and II, first light source light 111 can reach the second converter material 225 after transmission via the first converter material 215. As shown in embodiments schematically depicted below, see FIGS. 2*a-f*, first light source light 111 can essentially only reach the second converter material 225 after scattering via the first converter material 215.

Further, in both embodiments a first thermally conductive element 410 in thermal contact with at least part of the second luminescent material 220 is schematically depicted.

In embodiments, the lighting device 1000 may comprise a first converter element 1215 comprising the first converter material 215, wherein the first converter element 1215 comprises a layer or a body. Alternatively or additionally, in embodiments the lighting device 1000 may comprise a second converter element 1225 comprising the second converter material 225. In embodiments, the second converter element 1225 comprises a layer or a body.

The first converter element 1215 has a first surface area A1, and the second converter element 1225 has a second surface area A2.

In embodiments, the first converter element 1215 and the second converter element 1225 may be configured in a layered structure 1245.

Especially, at least 35% of the second surface area A2 may be in thermal contact with the first thermally conductive element 410. Especially, in (other) embodiments a first ratio R1 of a percentage PA1 of the first surface area A1 in thermal contact with the first thermally conductive element 410 to a percentage PA2 of the second surface area A2 in thermal contact with the first thermally conductive element 410 is selected from the range of $0 \leq R1 \leq 0.5$.

Reference O indicates the optical axis of the (beam of) first light source light 111. Here, the optical axis O is incident on the first converter material 215 and on the second converter material 225.

Lighting device light 1001 may emanate from a light exit window or radiation exit face. The face from which the lighting device light 1001 may emanate from the lighting device 1000 is indicated with reference 425.

Figures 2A, 2B, 2C:
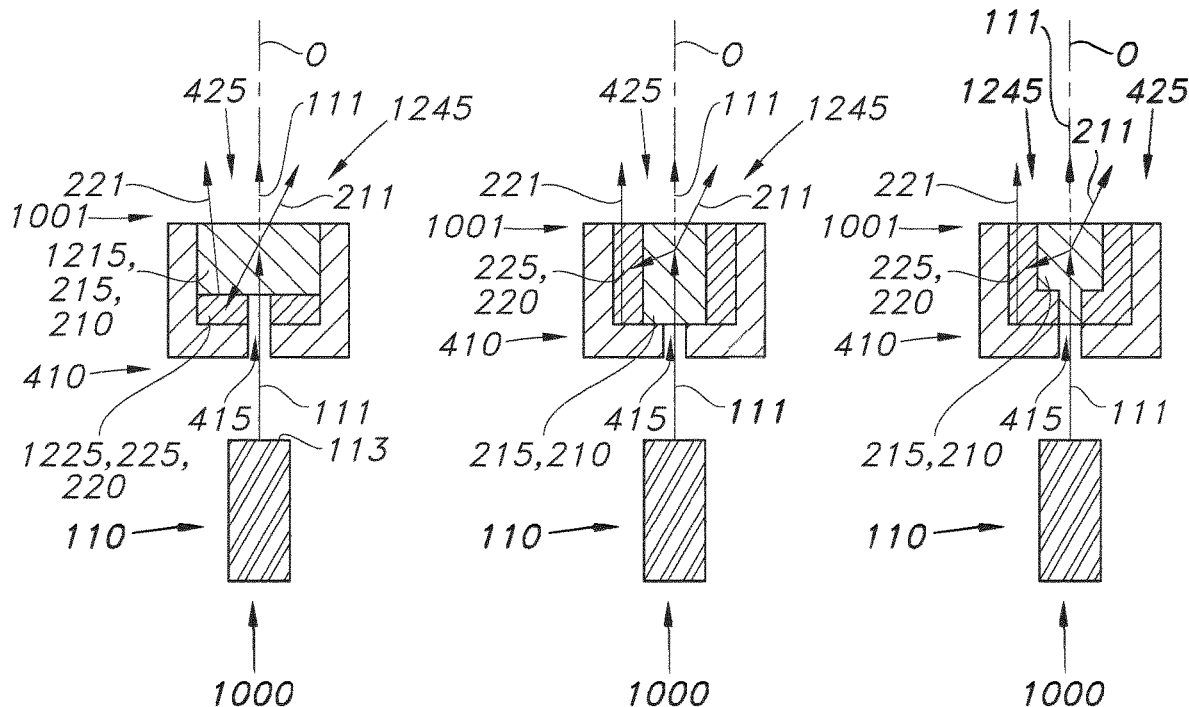
FIGS. 2a-2f schematically depict some further variants.
Figure 2D:
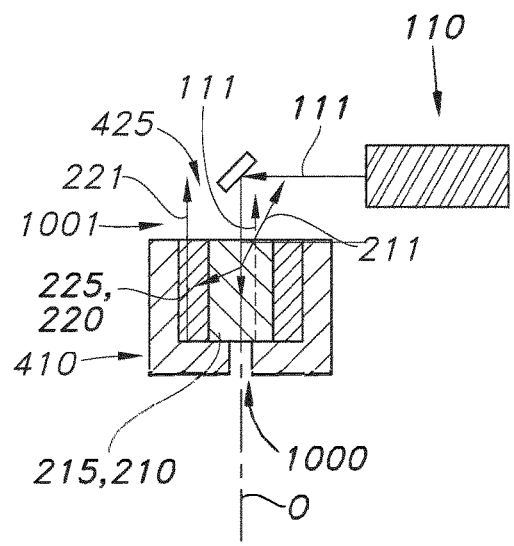
Figure 2E:
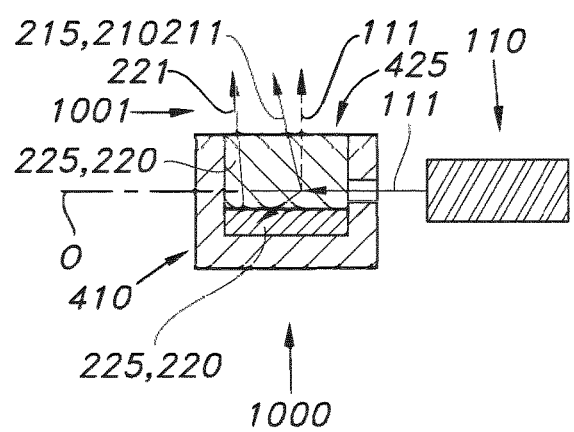
Figure 2F:
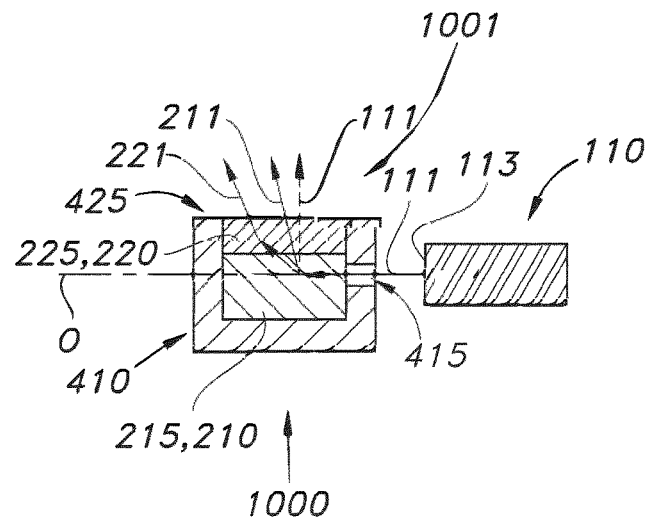
Figure 3F:
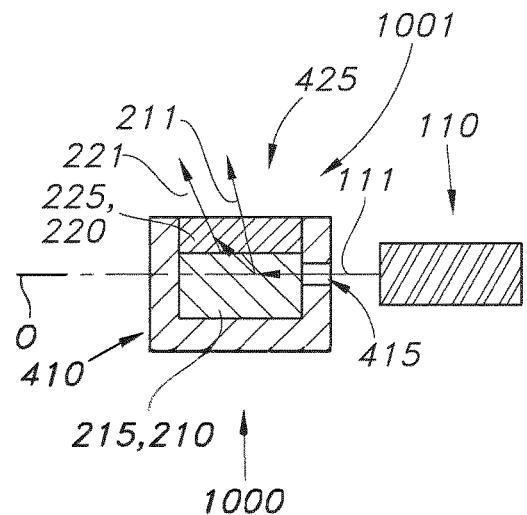

Amongst others, referring to FIGS. 2-3 in embodiments the first thermally conductive element 410 may at least partly enclose the first converter material 215 and the second converter material 225.

In specific embodiments, the first thermally conductive element 410 comprises a window 415. Such window 415 may comprises one or more of a light transmissive material and an opening. As schematically depicted, the first light source 110 may be configured upstream of the window 415 and the first converter material 215 may be configured downstream of the window 415.

As also schematically depicted, in several embodiments the second converter material 225 may be configured downstream of the first converter material 215.

As schematically depicted, the lighting device 1000 is especially configured to generate lighting device light 1001. The lighting device light 1001 may be white lighting device light. The lighting device light 1001 may especially comprise the first luminescent material light 211, the second luminescent material light 221, and the light source light 111.

In specific embodiments, the first converter material 215, the second converter material 225, and the first light source 110 are configured such that at least 90% of the second luminescent material light 221 is generated by conversion of the first light source light 111.

Therefore, amongst others the invention provides a high-quality white laser-based light source by indirect pumping of a red phosphor.

Hence, amongst others it is herein suggested to use a red phosphor in a configuration with green/yellow emitting phosphor so that red phosphor is activated only by the green phosphor to emit red light (FIG. 2*a-f*). Due to reduced stokes shift going from yellow/green to red instead of going blue laser light to red, the temperature increase in red is also reduced. Furthermore, in these configurations larger surface area of red phosphor is in contact with the heat sinking for avoiding temperature quenching. Referring to FIG. 2, one may use a transmissive mode (FIG. 2*a-c*) or a reflective mode (FIG. 2*d-e*). Further, as also shown in FIG. 2 one may use a pinhole (FIG. 2*a-c, e, f*) or no pinhole (FIG. 2*d*). The pin hole may e.g. be located at the bottom (FIG. 2*a-c*) or at the side (FIG. 2*e-f*).

Hence, amongst others the invention provides a lighting device which comprises in embodiments: a laser light source configured to emit laser light; a luminescent arrangement arranged at a distance different from zero with respect to the laser light source; wherein the luminescent arrangement comprises a first luminescent element being able to convert laser light into first converted light and a second luminescent element being able to convert laser light and first converted light into second converted light; wherein the second luminescent element is only activated by the first converted light.

The first luminescent element (e.g. green/yellow phosphor) may be arranged in the partial conversion mode i.e. part of the blue light is not converted (FIG. 2a-f). It goes without saying that the lighting device may also be based on full conversion (see dashed arrows) in FIG. 2.

The first light source may be configured to provide blue light. However, the first light source may also be configured to generate UV radiation, see e.g. FIG. 3.

Figures 4A, 4B, 4C:
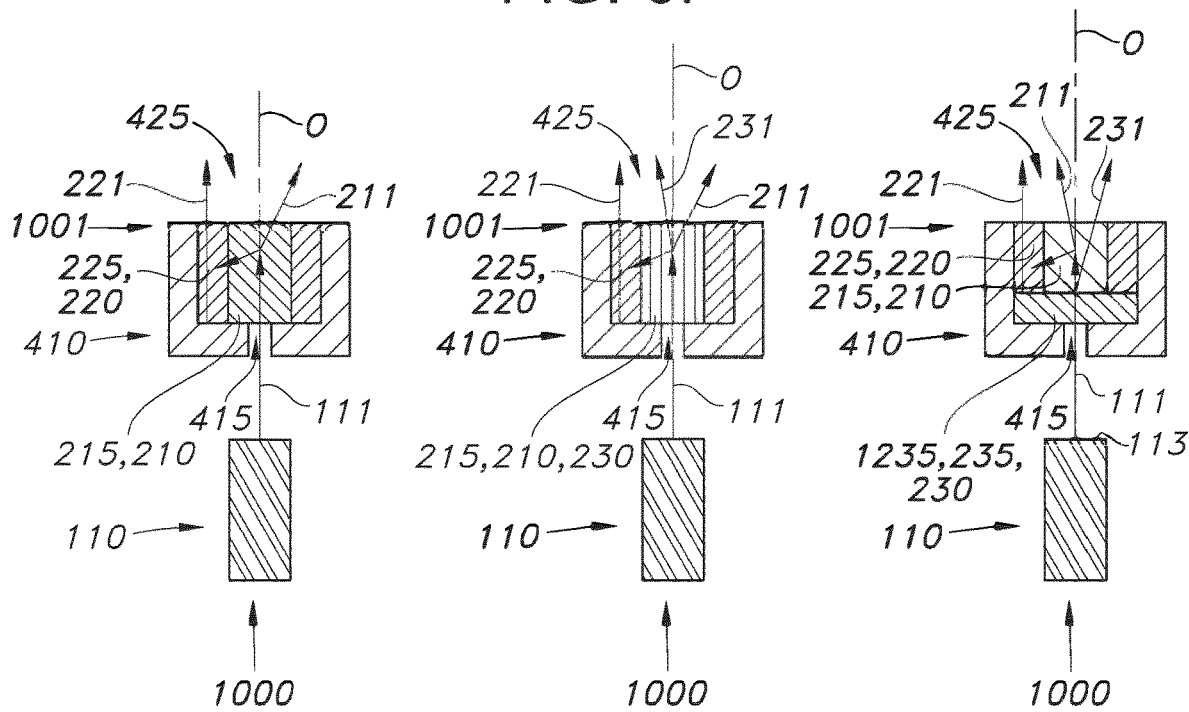
FIGS. 4a-4e schematically depict some aspects and variants.

One may also add a blue luminescent material, see FIG. 4a, or use a mix of a blue and green luminescent material, see FIG. 4b. One may use a stack of a blue luminescent material and a green luminescent material, see FIG. 4c.

Hence, e.g. FIGS. 4b-4c may also schematically depict embodiments of the lighting device 1000, further comprising a third converter material 235, comprising a third luminescent material 230, configured to convert at least part of the first light source light 111 into third luminescent material light 231 having a third luminescent material light spectral power distribution. Especially, in embodiments the third luminescent material light 231 may have one or more wavelengths in the blue wavelength range, wherein the first luminescent material 210 is configured to convert at least part of one more of the third luminescent material light 231 and the first light source light 111. Especially, in such embodiments the first light source light 111 has one or more wavelengths in the UV.

Figure 4D:
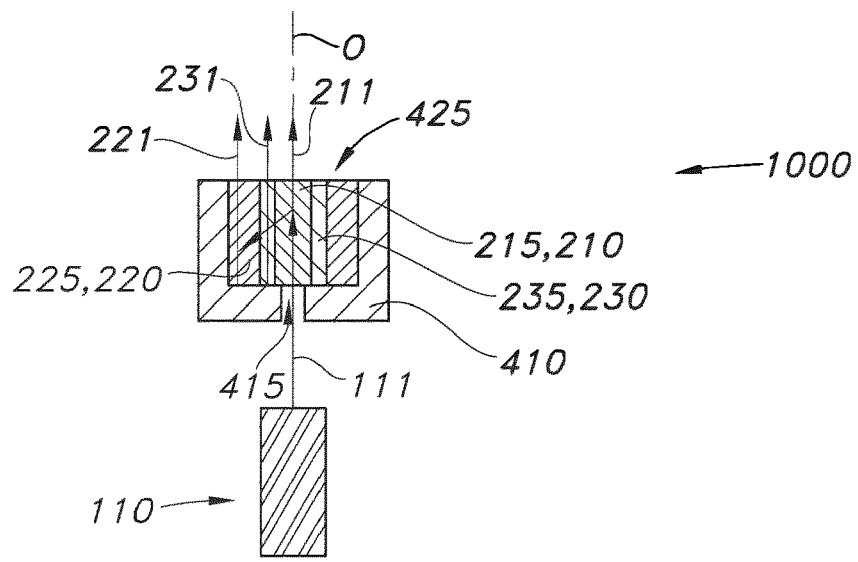

One may also use a layered system, see FIG. 4d.

One may also use addition optical components 510, such as a lens, upstream the luminescent element and/or one may also use addition optical components, such as a lens, downstream the luminescent element. Here, in FIG. 4e by way of example two optical components 510 are schematically depicted, with an optional first optical component 511 downstream of the luminescent element; the second optional first optical component 512 is discussed below. Further, one may combine suggested light source with other solid state light sources such as LEDs or lasers (FIG. 4e).

Figure 4E:
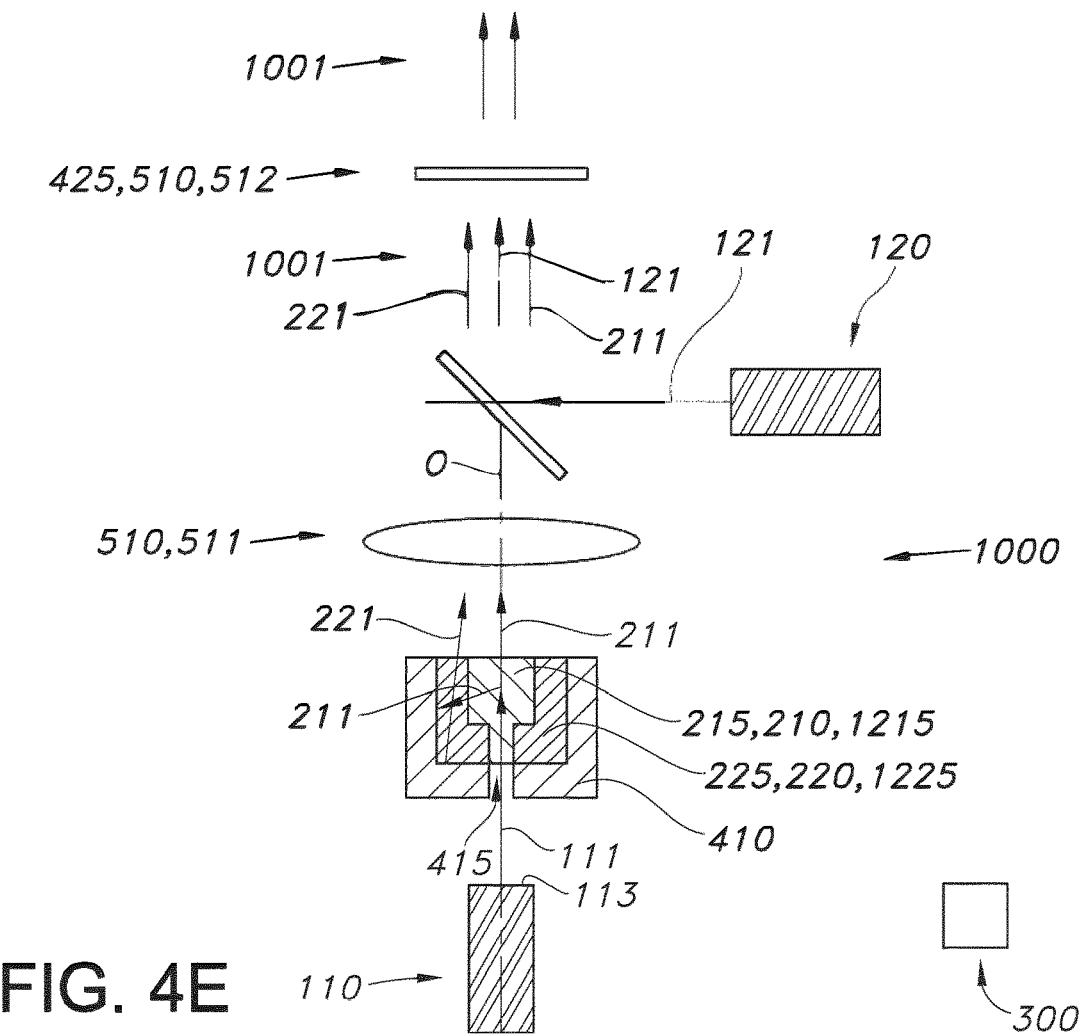

FIG. 4e also schematically depicts an embodiment of the lighting device 1000 further comprising a second light source 120 configured to generate second light source light 121 having a second light source light spectral power distribution, different from the first light source light spectral power distribution. The second light source light 121 may e.g. have one or more wavelengths in the red wavelength range, wherein the lighting device 1000 is configured to generate in one or more operation modes (white) lighting device light 1001 comprising the first luminescent material light 211, the second luminescent material light 221, the first light source light 111, and the second light source light 121, see e.g. also FIGS. 5a-5b. Here, by way of example the second light source is configured downstream of the first converter material and second converter material. However, the second light source may also be configured upstream thereof, especially when the first converter material and/or second converter material are transmissive for the at least part of the second light source light 121. For instance, a dichroic mirror may also be configured between the first light source 110 and the window 415. In this way, the second light source light 121 may also propagate through the window 415 and emanate from the first converter material 215 and/or second converter material.

Especially, in embodiments the second light source may be configured to generate orange and/or red light source light. Especially, the second light source comprises or is a laser light source, configured to generate the orange or red light source light.

FIG. 4e also schematically depicts an embodiment of the lighting device 1000, further comprising a control system 300. The control system 300 is configured to control a spectral power distribution of the lighting device light 1001.

FIG. 4e also schematically depicts a second optical element 512, which may e.g. be configured to mix light or to collimate light, etc. FIG. 4e schematically depicts a plurality of elements, of which one or more may also be used in other herein depicted embodiments. The elements of FIG. 4e are not necessarily comprising in a single embodiment.

Referring to e.g. FIGS. 2a-2d, 3a-3d, 4a-4e, one or more of the layers, in specific embodiments both layers, may be configured in a curved shape. For instance, the layers may have the shape of cylinder or rod, like a cylinder in a cylinder, or like a rod in a cylinder. In embodiments, the first converter material may (as layer) enclose the second converter material (as layer or as body). In other embodiments, the second converter material may (as layer) enclose the first converter material (as layer or as body). Such layered system may be hollow. However, such layered system may also be a solid body. Layered systems may have a square or circular cross-section. However, other embodiments may also be possible, like hexagonal or trigonal, etc.

Referring to FIGS. 2, 3 and 4, the optical axis O is incident on the first converter material 215 and is not incident on the second converter material 225.

A number of lighting devices were investigated, and it was found that it is not easy, or virtually impossible to generate a lighting device with a correlated color temperature of 2700 K with an R9>50 on the basis of a garnet based luminescent material and a red laser, such as at a wavelength of 620 nm.

It was surprisingly found that a lighting device with laser based light source which has good color quality (rendering index CRI >90 and CCT in the range 2700-4000K) and at the same time offering high brightness, an order of magnitude higher than for existing LED sources, is possible. The proposed architecture allows to mitigate thermal and photosaturation issues of red phosphor by proposed way of arrangement of phosphor components with respect to each other and pump laser sources, thermal management and addition of red laser to minimize thermal and optical load on the red phosphor. Especially, the interaction between the yellow/green and the red phosphor (re-absorption) results in a red shift of the garnet emission without the need for high Gd and/or Ce doping, resulting in a thermally more stable garnet system.

Amongst others, herein embodiments of a (solid state high-brightness light source package) lighting device are proposed, wherein the lighting device comprises: a blue pump laser; a first (ceramic, e.g. YAG-type-based) phosphor emitting in the green-yellow spectral range; a second phosphor emitting in the amber-red spectral range (especially (also) ceramic). Especially, the two phosphor components may be arranged such that the second phosphor is excited both by a blue laser and emission from a first phosphor, therefore re-absorbing the green emitted spectrum and shifting the emission from the first phosphor towards longer wavelength. Further, in specific embodiments an additional red laser may be used to release thermal and optical load on the red phosphor, increase CRI and tune the color point of the light source.

Figure 5A:
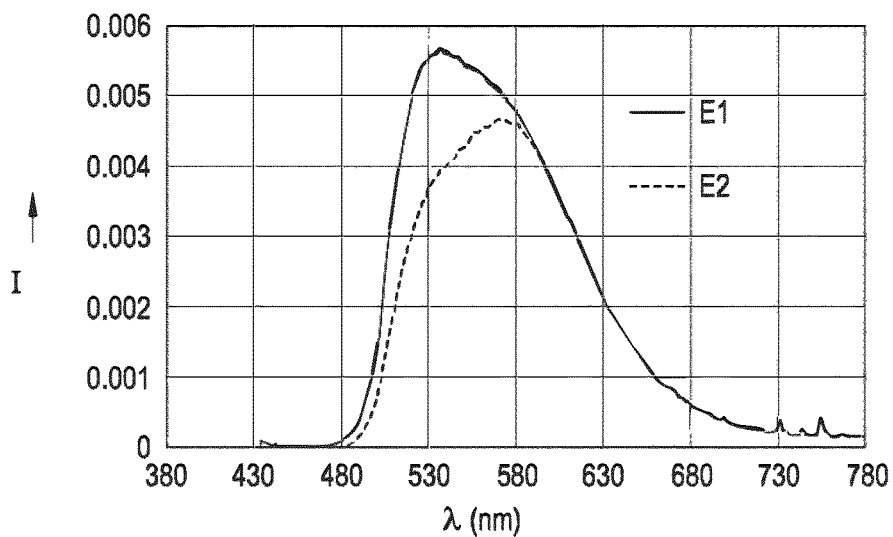
FIGS. 5a-5b show some emission spectra of embodiments.
Figure 5B:
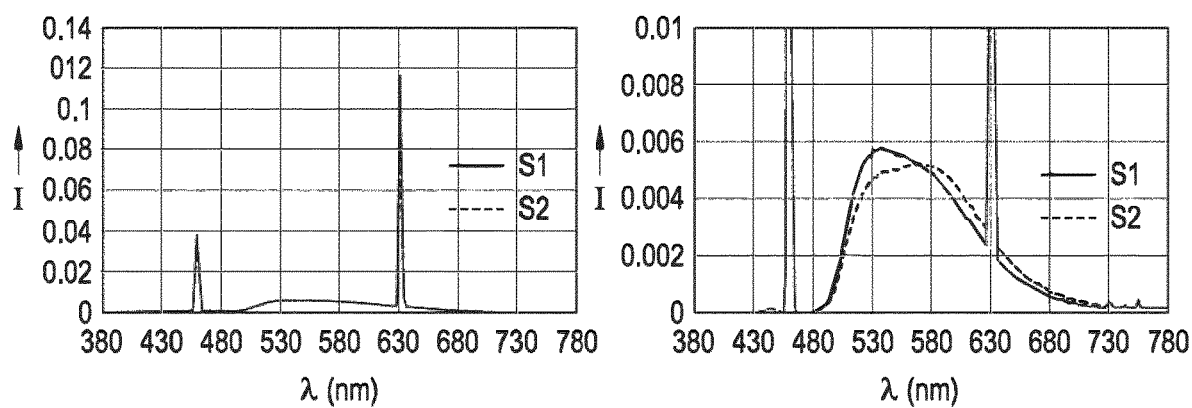

3000 K warm white light may be generated using a YAG garnet phosphor (0.4 mol % Ce), a 460 nm blue laser in combination with a 632 nm red laser. CRI=82 and R9 is equal to 15. It appear that adding some red phosphor to the system (output of red phosphor is only 9% of yellow) and combining this with a red laser of 632 nm yields a CRI of 90 and an R9 of 69; see FIGS. 5a-5b for the spectral compositions comprising these two phosphors. FIG. 5a depicts a ceramic body of YAG:Ce (0.4 mole %) without re-absorption (E1 curve) and after re-absorption by red phosphor (E2 curve; phosphor is not excited by blue LED). Phosphor emission is red shifted by 25 pts in CIE u'. When generating a 3000K spectrum using these two phosphors in combination with a blue laser only, results in a CRI of 68 and an R9 of −45. The orange-red contribution to the spectrum would be 35%. So we only generate a small amount of red phosphor light, the additional red shift of the spectrum is caused by re-absorption of yellow light and red laser light (FIG. 5a). FIG. 5b shows the spectral power distribution of a 3000K light source using a ceramic body of YAG in combination with 460 nm blue laser and 632 nm red laser (S1). In the S2 case some orange/red phosphor was added. In the S1 case, CRI=82 and R9=15. In the S2 case: CRI=90 and R9=69.

As in a previous case optical component can be attached at the exit (top) side of the package facilitation additional cooling of the top phosphor component.

Figure 6A:
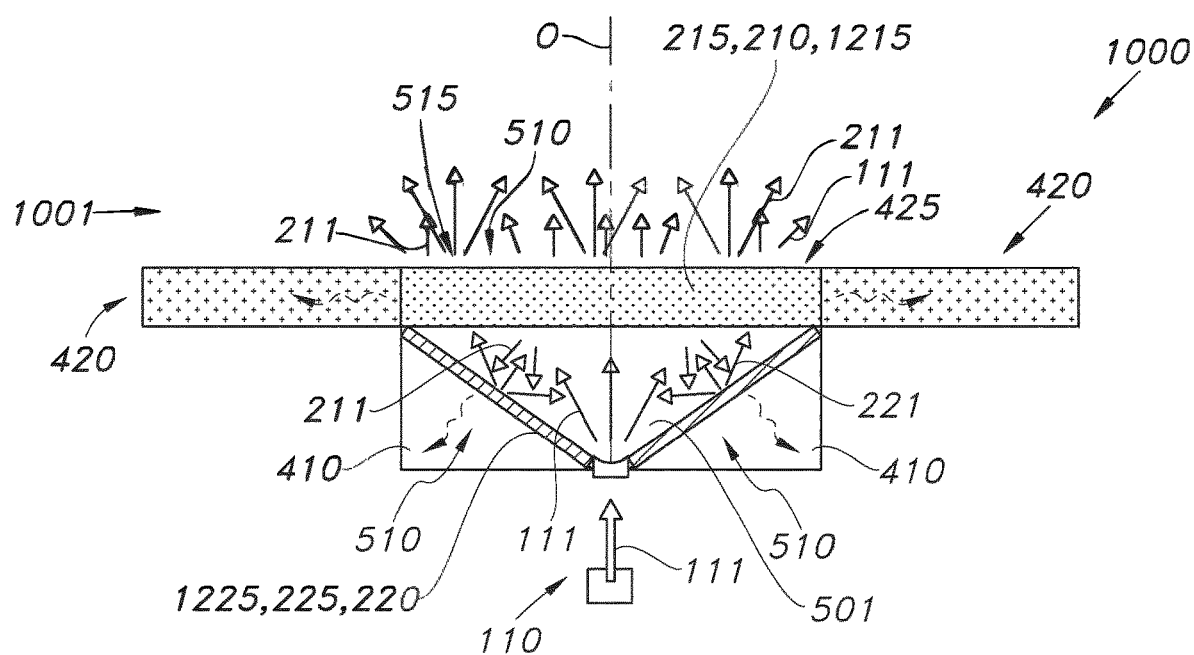
FIGS. 6a-6c schematically depict some embodiments and variants.

In embodiments the red and green phosphor may not be in the immediate contact and arranged in a mixing chamber (FIG. 6a). This may assist in further reducing the level of pump optical power density on the red phosphor and gives a possibility to split thermal management path for the two phosphor systems. Especially, the main blue pump light excites green phosphor locate in the exit window. Blue light can enter the mix box through the small optical window or lens component (e.g. negative or a free-form lens) spreading the excitation light on a green phosphor uniformly. Blue light is partially converted in a phosphor and partially transmitted to the output direction. Part of the green light (approximately 50%) is being re-emitted back into the mixing chamber where it excites red phosphor. Blue light is also partially reflected from the green phosphor due to Fresnel reflection and scattering in the phosphor. This back reflected blue and green light excites the red phosphor which is located on the sides of the mix box. The thickness and the area of the red phosphor is tuned to absorb at least part of the incident green and blue light, especially the short wavelength side of the emission band. The red light emitted into a mix box goes through the green phosphor towards the output.

The shape of the mixing chamber is not limited to the one schematically depicted in the FIG. 6a. The ratio of the height to the width dimensions of the mixing chamber, the inclination of the walls (can be also straight walls) as well as the dimensions of the exit window with respect to the laser light entrance can be optimized for maximum efficiency, required source brightness and the amount of area needed for the red phosphor. This architecture where green and red phosphors are not with immediate contact with each other provides the possibility to split thermal management paths. For instance, green phosphor can be embedded (co-sintered) in the ceramic plate and cooled from the sides or attached to the optical component at the exit with good thermal conductivity (top cooling). The red phosphor can be attached to the side walls of the mix box constituting a separate heatsink. The mix box can comprise different types of red phosphors attached to different side walls, or combination of red and amber phosphor.

Hence, FIG. 6a schematically depicts an embodiment of the lighting device 1000 comprising a light mixing chamber 500. The light mixing chamber 500 comprises an envelope 510 and a chamber window 515, together defining a chamber volume 501. In the schematically depicted embodiment, the envelope 510 comprises (at least part of) the second luminescent material 220 and the chamber window 515 comprises (at least part of) the first luminescent material 210. The chamber window 515 may comprise the radiation exit face 425.

Further, a variant is schematically depicted wherein one or more of the following applies: (i) equal to or less than 10% of the first surface area A1 may be in thermal contact with the second converter element 1225, and (ii) equal to or less than 10% of the second surface area A2 may be in thermal contact with the first converter element 1215.

Further, a variant is schematically depicted wherein the first converter element 1215 is configured in thermal contact with a second thermally conductive element 420, and wherein the second converter element 1225 is configured in thermal contact with the first thermally conductive element 410. Especially, the first thermally conductive element 410 and the second thermally conductive element 420 may not be in thermal contact with each other.

Figure 6B:
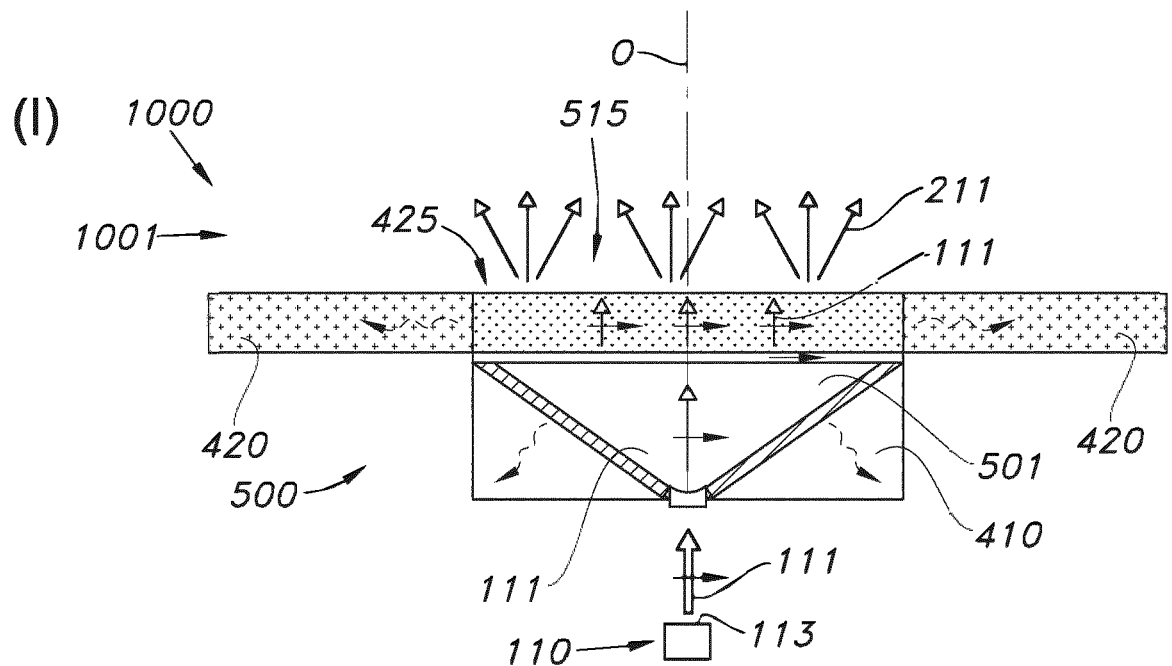
Figure 6B:
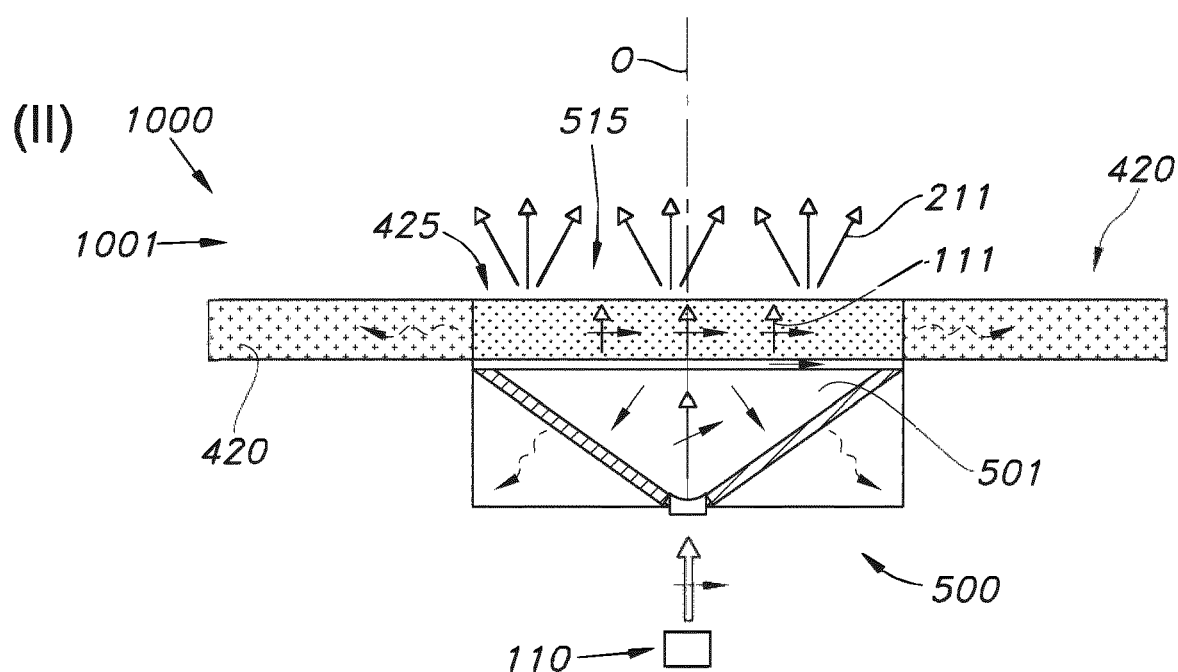

In embodiments, the amount of blue laser light exciting the green phosphor and reflecting towards the red phosphor can be tuned, providing the way to realize color point tunable architecture. This tunability can be achieved using reflective polarizer element just below the green phosphor (in between green and red converters) (see FIG. 6b). When polarization direction of blue laser coincides with allowed direction for polarizer, almost all blue light will be transmitted towards the green phosphor. In case these two orientations will be misaligned the blue pump, light will be partially transmitted to the green and partially reflected towards red phosphor, allowing to tune a color point. The tuning can be realized for instance keeping the reflective polarizer element fixed in the mixing box and rotating (e.g. mechanically) the orientation of the blue laser and its polarization plane with respect to a mix box. Examples of such a reflective polarizers can be DBEF foil of 3M or glass-based wire grid (e.g. by Moxtec) polarizer component. FIG. 6b schematically depicts a color-tunable embodiment with reflective polarizer with aligned (left) and misaligned (right) polarization directions.

In embodiments, an alternative way to release thermal and optical load on the red phosphor is to use additional red laser light, for example in the wavelength range of 630-635 nm. This also allows to tune the spectral color point and helps in additional increase of CRI of the light source. The architecture can be similar to the embodiment where red laser light can be set to propagate collinearly/combined with the blue laser. The same is possible in the architecture of the embodiment as described in relation to FIG. 6a.

In versions of the embodiment described in relation to FIG. 6b, when a red laser enters the mix box, the orientation of its polarization plane may not coincide with the one of the blue lasers. In case the polarization planes of the blue and red lasers with respect to the mix box comprising reflective polarizer can be set (rotated) independently, larger freedom in color tunability can be obtained.

In embodiments, other combinations with more lasers to achieve color tunable system are possible. In addition to the main pump blue laser the red or amber phosphor can be pumped through a side of a mix box (transparent heatsink with dichroic reflector or laser entering through a tiny hole into a chamber) by another, e.g. green laser. Or alternatively, a red laser can also enter though the side of the mix box which either contains or is free from the phosphor. Possible configurations for mix box geometries with multiple lasers are presented in FIG. 6c.

Figure 6C:
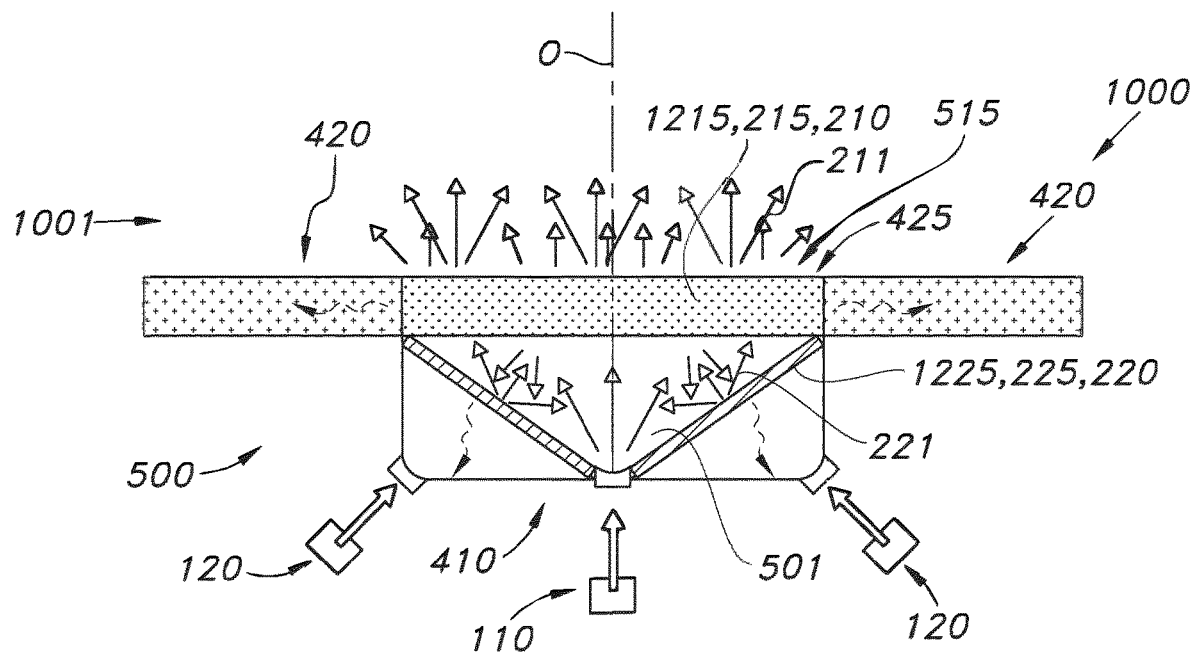

Referring to e.g. FIGS. 6a-6c, one layer may be curved (second converter element) and another layer may be planar (first converter element). For instance, one layer may have a conical shape, and another layer may be planer. However, the shape of the second converter element may also be pyramidal (and of the first converter element rectangular).

Many of the above schematically depicted embodiments show embodiments of the lighting device 1000, wherein the second luminescent material 220 is configured to convert one or more of (i) part of the first luminescent material light 211 and (ii) part of the first light source light 111 into second luminescent material light 221 (having a second luminescent material light spectral power distribution different from the first luminescent material light spectral power distribution, wherein the second luminescent material light 221) having one or more wavelengths in the amber-red wavelength range. Further, especially the second luminescent material 220 may be configured to convert part of the first luminescent material light 211 and part of the first light source light 111 into second luminescent material light 221. Yet further, especially the first converter material 215 may be at least partly transmissive for the first light source light 111. Yet further, in specific embodiments one or more of the first converter material 215 and the second converter material 225 are provided as ceramic body.

Figure 7A:
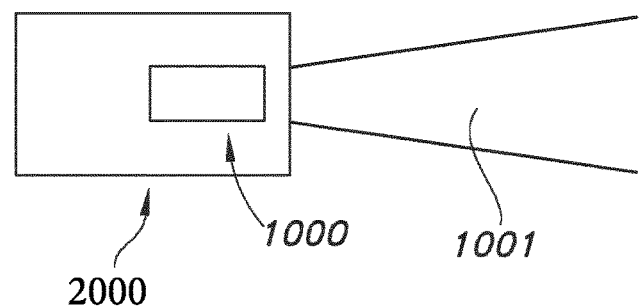
FIGS. 7a-7b schematically depict a projection system and a luminaire according to the invention, respectively.

FIG. 7a schematically depicts a projection system 2000 comprising a lighting device 1000 that generates lighting device light 1001. The projection system 2000 may optionally further include a controller (not shown in FIG. 7a) for controlling the lighting device 1000.

Figure 7B:
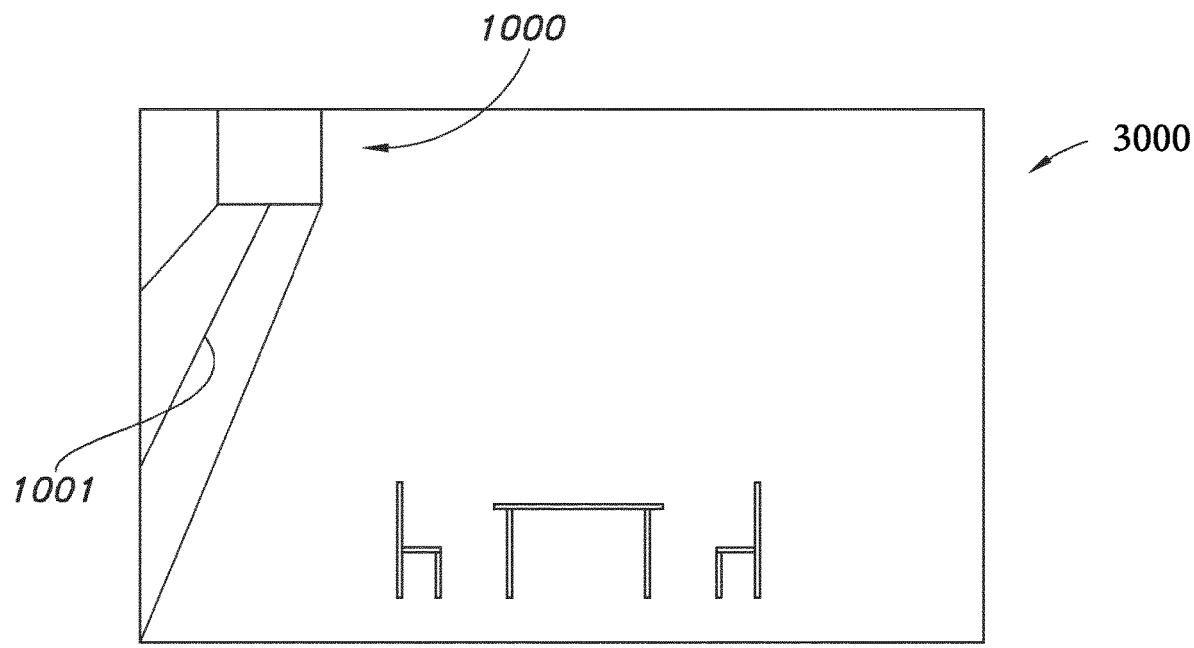

FIG. 7b schematically depicts a luminaire 3000 comprising a lighting device 1000 that generates lighting device light 1001. The luminaire 3000 may optionally further include a controller (not shown in FIG. 7b) for controlling the lighting device 1000.

In the herein schematically depicted embodiments, the (first) light source is especially configured in a remote configuration. For instance, the distance between a radiation exit face, indicated with reference 113, of the first light source 110 and the first converter material 210 may be selected from the range of 10 µm-10 mm.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 110%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
   a first light source configured to generate first light source light, having a first light source light spectral power distribution, wherein the first light source comprises a laser light source, and wherein the first light source light has an optical axis;
   a first converter material, comprising a first luminescent material, configured to convert at least part of the first light source light into first luminescent material light having a first luminescent material light spectral power distribution, wherein the first luminescent material light has one or more wavelengths in the green and/or yellow wavelength range;

a second converter material, comprising a second luminescent material, configured to convert one or more of (i) part of the first luminescent material light and (ii) part of the first light source light into second luminescent material light having a second luminescent material light spectral power distribution different from the first luminescent material light spectral power distribution, wherein the second luminescent material light has one or more wavelengths in the orange and/or red wavelength range; wherein the first light source, the first converter material, and the second converter material are configured such that first light source light can only reach the second converter material after scattering via the first converter material; wherein the optical axis is incident on the first converter material and is not incident on the second converter material; and a first thermally conductive element in thermal contact with at least part of the second luminescent material, wherein the first thermally conductive element at least partly encloses the first converter material and the second converter material, wherein the first thermally conductive element comprises a window, wherein the window comprises one or more of a light transmissive material and an opening, wherein the first light source is configured upstream of the window and wherein the first converter material is configured downstream of the window.

2. The lighting device according to claim 1, wherein the second converter material is transmissive for one or more of (i) at least part of the first light source light and (ii) at least part of the first luminescent material light; wherein the first light source, the first converter material, and the second converter material are configured such that one or more of (a) at least part of the first light source light and (b) at least part of the first luminescent material light escapes from the lighting device via the second converter material.

3. The lighting device according to claim 1, comprising (i) a first converter element comprising the first converter material, wherein the first converter element comprises a layer or a body, and (ii) a second converter element comprising the second converter material, wherein the second converter element comprises a layer or a body; wherein the first converter element has a first surface area A1, and wherein the second converter element has a second surface area A2, wherein the first converter element and the second converter element are configured in a layered structure, wherein at least 35% of the second surface area A2 is in thermal contact with the first thermally conductive element, and wherein a first ratio R1 of a percentage PA1 of the first surface area A1 in thermal contact with the first thermally conductive element to a percentage PA2 of the second surface area A2 in thermal contact with the first thermally conductive element is selected from the range of 0≤R1≤0.5.

4. The lighting device according to claim 1, wherein the first thermally conductive element comprises a reflective material with equal to or less than 10% diffuse reflection under perpendicular radiation.

5. The lighting device according to claim 1, wherein the first thermally conductive element comprises AlSiMgMn.

6. The lighting device according to claim 1, wherein the lighting device is configured to generate white lighting device light comprising the first luminescent material light, the second luminescent material light, and the light source light.

7. The lighting device according to claim 1, wherein the first converter material, the second converter material, and the first light source are configured such that at least 90% of the second luminescent material light is generated by conversion of the first light source light.

8. The lighting device according to claim 1, wherein the second luminescent material light has one or more wavelengths in the amber-red wavelength range.

9. The lighting device according to claim 8, wherein the first converter material is at least partly transmissive for the first light source light, and wherein one or more of the first converter material and the second converter material are provided as ceramic body.

10. The lighting device according to claim 1, further comprising a second light source configured to generate second light source light having a second light source light spectral power distribution, different from the first light source light spectral power distribution, wherein the second light source light has one or more wavelengths in the red wavelength range, wherein the lighting device is configured to generate in one or more operation modes white lighting device light comprising the first luminescent material light, the second luminescent material light, the first light source light, and the second light source light.

11. The lighting device according to claim 10, further comprising a control system, wherein the control system is configured to control a spectral power distribution of the lighting device light.

12. The lighting device according to claim 1, wherein one or more of the following applies: (i) equal to or less than 10% of the first surface area A1 is in thermal contact with the second converter element, and (ii) equal to or less than 10% of the second surface area A2 is in thermal contact with the first converter element.

13. The lighting device according to claim 1, comprising a light mixing chamber, wherein the light mixing chamber comprises an envelope and a chamber window, together defining a chamber volume, wherein the envelope comprises at least part of the second luminescent material and wherein the chamber window comprises at least part of the first luminescent material.

14. The lighting device according to claim 1, further comprising a third converter material, comprising a third luminescent material, configured to convert at least part of the first light source light into third luminescent material light having a third luminescent material light spectral power distribution, wherein the third luminescent material light has one or more wavelengths in the blue wavelength range, wherein the first luminescent material is configured to convert at least part of one more of the third luminescent material light and the first light source light.

15. A projection system or a luminaire comprising a lighting device according claim 1.

* * * * *